(12) United States Patent
Hastings et al.

(10) Patent No.: US 12,358,593 B2
(45) Date of Patent: Jul. 15, 2025

(54) BASH GUARD DEVICE AND SYSTEM FOR BICYCLE COMPONENTS

(71) Applicant: SRAM, LLC, Chicago, IL (US)

(72) Inventors: Melissa Hastings, Colorado Springs, CO (US); Stephanie Raulston, San Luis Obispo, CA (US); Matthew Bush, San Louis Obispo, CA (US); Alexander Linke, Schonungen (DE)

(73) Assignee: SRAM, LLC, Chicago, IL (US)

( * ) Notice: Subject to any disclaimer, the term of this patent is extended or adjusted under 35 U.S.C. 154(b) by 241 days.

(21) Appl. No.: 17/555,593

(22) Filed: Dec. 20, 2021

(65) Prior Publication Data

US 2022/0227442 A1    Jul. 21, 2022

Related U.S. Application Data

(60) Provisional application No. 63/138,013, filed on Jan. 15, 2021.

(51) Int. Cl.
| | |
|---|---|
| *B62M 9/138* | (2010.01) |
| *B62J 13/00* | (2006.01) |
| *B62M 9/00* | (2006.01) |
| *B62M 9/10* | (2006.01) |

(52) U.S. Cl.
CPC ............ *B62M 9/138* (2013.01); *B62M 9/105* (2013.01); *B62J 13/00* (2013.01); *B62M 2009/007* (2013.01)

(58) Field of Classification Search
CPC ... B62J 13/00; B62J 23/00; B62J 13/02; B62J 13/06; B62J 13/04; B62M 9/00; B62M 2009/007; B62M 9/10; B62M 9/105; B62M 9/138; B62M 9/02; B62M 9/04; B62M 9/128; F16H 55/30
USPC ........................................................ 474/144
See application file for complete search history.

(56) References Cited

U.S. PATENT DOCUMENTS

| | | | | |
|---|---|---|---|---|
| 394,335 | A * | 12/1888 | Chase | ...................... F16H 55/30 |
| | | | | 474/164 |
| 877,820 | A * | 1/1908 | Badger | ...................... F16H 7/18 |
| | | | | 74/609 |
| 1,181,175 | A * | 5/1916 | Ohyabu | ..................... F16H 7/18 |
| | | | | 474/151 |

(Continued)

FOREIGN PATENT DOCUMENTS

| | | | |
|---|---|---|---|
| CH | 655067 A5 * | 3/1986 | ............ B62M 9/105 |
| CN | 100377961 C | 4/2008 | |

(Continued)

OTHER PUBLICATIONS

English translation of DE 202013103872 U1 From PE2E (Year: 2013).*

*Primary Examiner* — Henry Y Liu
*Assistant Examiner* — Raveen J Dias

(57) ABSTRACT

A chainring protection system includes a chainring having a torque input section and a torque output section. The torque output section is radially outer relative to the torque input section and has a plurality of teeth. The chainring protection system also includes a cover connected to the chainring, such that the cover at least partially covers a circumferential portion of the torque output section. The circumferential portion of the torque output section includes less than all teeth of the plurality of teeth.

17 Claims, 18 Drawing Sheets

(56) References Cited

U.S. PATENT DOCUMENTS

| | | | | |
|---|---|---|---|---|
| 1,636,327 | A * | 7/1927 | Roe | B62J 13/00 474/144 |
| 3,416,385 | A * | 12/1968 | Schenk | F16H 55/30 474/151 |
| 3,477,303 | A * | 11/1969 | Brilando | B62M 9/10 474/144 |
| 3,815,439 | A * | 6/1974 | Tarutani | B62M 9/10 474/144 |
| 3,835,729 | A * | 9/1974 | Tarutani | F16P 1/04 474/144 |
| 4,044,621 | A * | 8/1977 | McGregor, Sr. | B62J 13/00 74/609 |
| 4,240,303 | A * | 12/1980 | Mosley | F16H 57/04 474/151 |
| 4,261,214 | A * | 4/1981 | Watanabe | B62M 9/00 474/151 |
| 4,453,924 | A * | 6/1984 | Sugino | F16H 55/30 474/902 |
| 4,475,894 | A * | 10/1984 | Sugino | B62M 9/105 474/144 |
| 4,487,424 | A * | 12/1984 | Ellis | B62J 13/00 74/609 |
| 4,586,914 | A * | 5/1986 | Nagano | B62M 9/105 474/160 |
| 4,642,075 | A * | 2/1987 | Nagashima | B62M 9/105 474/158 |
| 5,003,840 | A * | 4/1991 | Hinschlager | B62J 23/00 74/609 |
| 5,158,505 | A * | 10/1992 | Woyach | B65G 23/06 474/98 |
| 5,320,583 | A * | 6/1994 | van Wingen born Looyen | B62J 13/00 74/609 |
| 5,460,576 | A * | 10/1995 | Barnett | B62M 9/136 474/140 |
| 5,464,373 | A * | 11/1995 | Leng | B62M 9/105 474/140 |
| 5,725,450 | A * | 3/1998 | Huskey | B62M 9/16 474/134 |
| 6,231,136 | B1 * | 5/2001 | Freeman | B62D 55/088 305/107 |
| 6,354,973 | B1 * | 3/2002 | Barnett | B62J 13/00 474/140 |
| 6,475,110 | B1 * | 11/2002 | Yamanaka | B62M 9/105 474/144 |
| 6,533,690 | B2 * | 3/2003 | Barnett | B62M 9/138 474/140 |
| 7,066,856 | B1 * | 6/2006 | Rogers | B62J 23/00 474/144 |
| RE42,436 | E * | 6/2011 | Rogers | B62J 23/00 474/144 |
| 8,888,629 | B2 * | 11/2014 | Ji | B62M 9/128 474/144 |
| 9,249,867 | B2 * | 2/2016 | Graziosi | F16H 7/18 |
| D774,992 | S * | 12/2016 | Hill | D12/127 |
| 10,124,849 | B2 * | 11/2018 | Ribeiro Miranda | B62M 3/16 |
| 10,308,318 | B2 * | 6/2019 | Niki | B62M 9/134 |
| 10,618,588 | B2 * | 4/2020 | Cody | B62M 9/00 |
| 10,703,438 | B2 * | 7/2020 | Jang | B62M 9/08 |
| 11,148,753 | B2 * | 10/2021 | Bush | F16H 55/12 |
| 11,814,135 | B2 * | 11/2023 | Ohyabu | B62M 1/36 |
| 11,867,274 | B2 * | 1/2024 | Hobbs | F16H 55/10 |
| 11,897,576 | B2 * | 2/2024 | Ohyabu | B62J 45/411 |
| 11,912,374 | B2 * | 2/2024 | Shipman | B62M 9/105 |
| 11,919,592 | B2 * | 3/2024 | Davis | B62M 9/00 |
| 2002/0026851 | A1 * | 3/2002 | Yamanaka | B62M 9/105 74/594.2 |
| 2002/0028719 | A1 * | 3/2002 | Yamanaka | B62J 13/00 474/160 |
| 2002/0160869 | A1 * | 10/2002 | Barnett | B62M 9/138 474/144 |
| 2005/0284252 | A1 * | 12/2005 | Fukui | B62M 3/003 74/594.2 |
| 2006/0046883 | A1 * | 3/2006 | Nishimoto | B62J 13/02 474/144 |
| 2006/0058139 | A1 * | 3/2006 | Fry | B62J 13/00 474/144 |
| 2006/0199690 | A1 * | 9/2006 | Gardner | F16H 7/18 474/144 |
| 2008/0176691 | A1 * | 7/2008 | Saifuddin | B62M 9/105 474/144 |
| 2008/0289927 | A1 * | 11/2008 | Ji | B62M 9/128 192/64 |
| 2008/0293528 | A1 * | 11/2008 | Paull | B62J 13/00 474/144 |
| 2013/0143703 | A1 * | 6/2013 | Schlumpf | F16H 55/171 474/152 |
| 2014/0051535 | A1 * | 2/2014 | Cranston | B62J 13/00 474/140 |
| 2014/0248982 | A1 * | 9/2014 | Schuster | B62M 9/06 474/69 |
| 2015/0094179 | A1 | 4/2015 | Shimano | |
| 2015/0353155 | A1 * | 12/2015 | Ribeiro Miranda | B62J 13/00 474/144 |
| 2017/0045121 | A1 * | 2/2017 | Staples | B62M 9/105 |
| 2018/0022418 | A1 * | 1/2018 | Pfeiffer | F16H 7/18 474/140 |
| 2018/0229793 | A1 * | 8/2018 | Cody | B62J 13/00 |
| 2019/0031285 | A1 * | 1/2019 | Jang | F16H 1/32 |
| 2019/0176920 | A1 * | 6/2019 | Cody | B62M 9/00 |
| 2019/0185108 | A1 * | 6/2019 | Bush | F16H 55/12 |
| 2021/0277986 | A1 * | 9/2021 | Hobbs | F16H 55/30 |
| 2023/0010468 | A1 * | 1/2023 | Davis | B62M 9/00 |
| 2023/0331339 | A1 * | 10/2023 | Ohyabu | B62J 45/411 |
| 2023/0331340 | A1 * | 10/2023 | Ohyabu | B62M 1/36 |

FOREIGN PATENT DOCUMENTS

| | | | | |
|---|---|---|---|---|
| CN | 101523108 | | 9/2009 | |
| CN | 101224782 | | 6/2012 | |
| CN | 203921109 U | * | 11/2014 | B62M 2009/007 |
| CN | 204821853 U | | 12/2015 | |
| CN | 205034222 U | | 2/2016 | |
| CN | 207145586 U | | 3/2018 | |
| CN | 109533138 A | * | 3/2019 | B62J 13/00 |
| DE | 202013103872 U1 | * | 11/2013 | B62J 13/00 |
| FR | 2479766 A1 | * | 10/1981 | B62J 13/00 |
| FR | 2482549 A1 | * | 11/1981 | B62M 9/105 |
| JP | H1120764 | | 1/1999 | |
| TW | 219031 | | 1/1994 | |
| TW | 483852 | | 4/2002 | |
| TW | M258028 U | | 3/2005 | |
| TW | M452902 U | | 5/2013 | |
| TW | 201836914 | | 10/2018 | |
| TW | M592405 U | | 3/2020 | |
| TW | 202021862 | | 6/2020 | |
| TW | I712548 | | 12/2020 | |

* cited by examiner

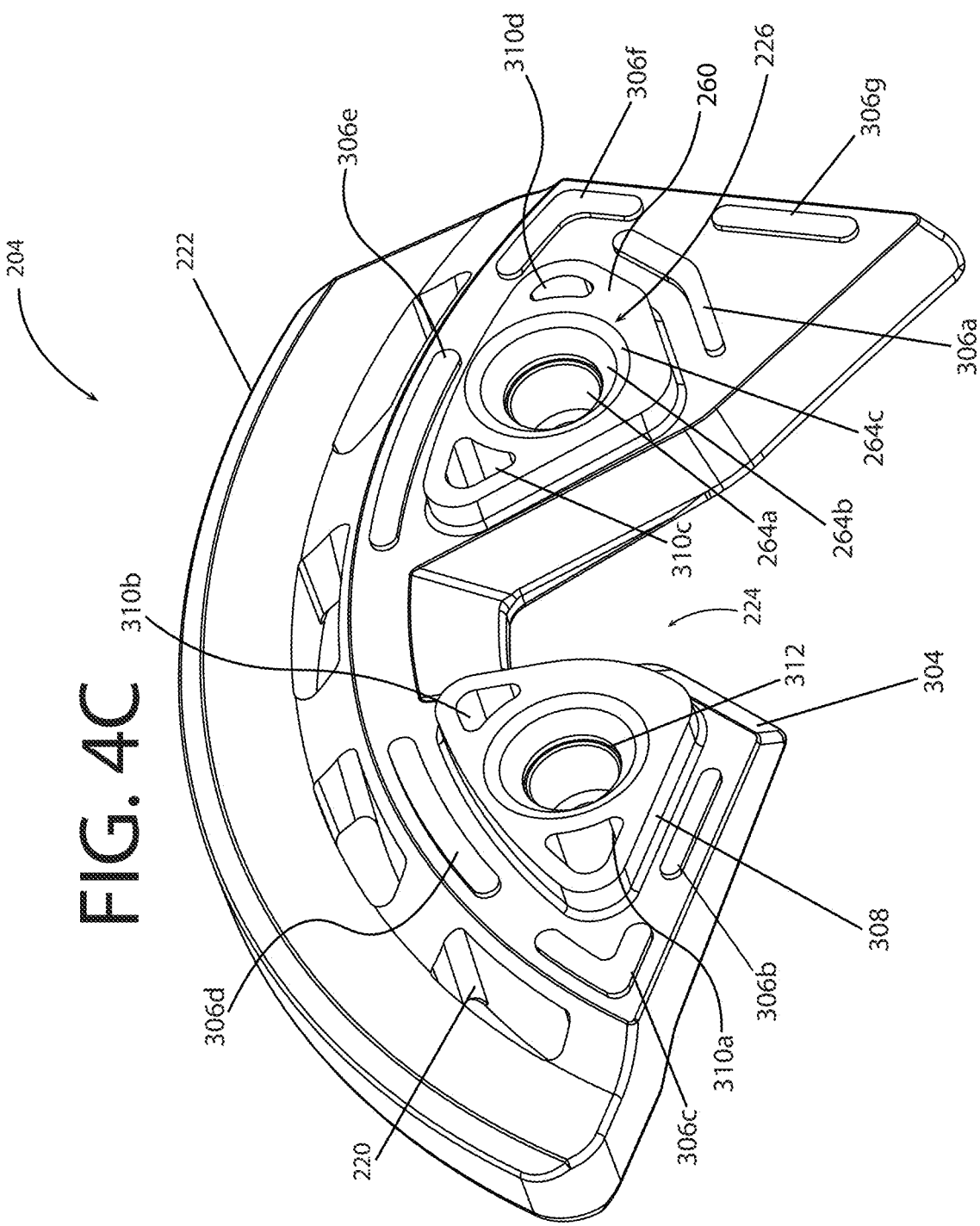

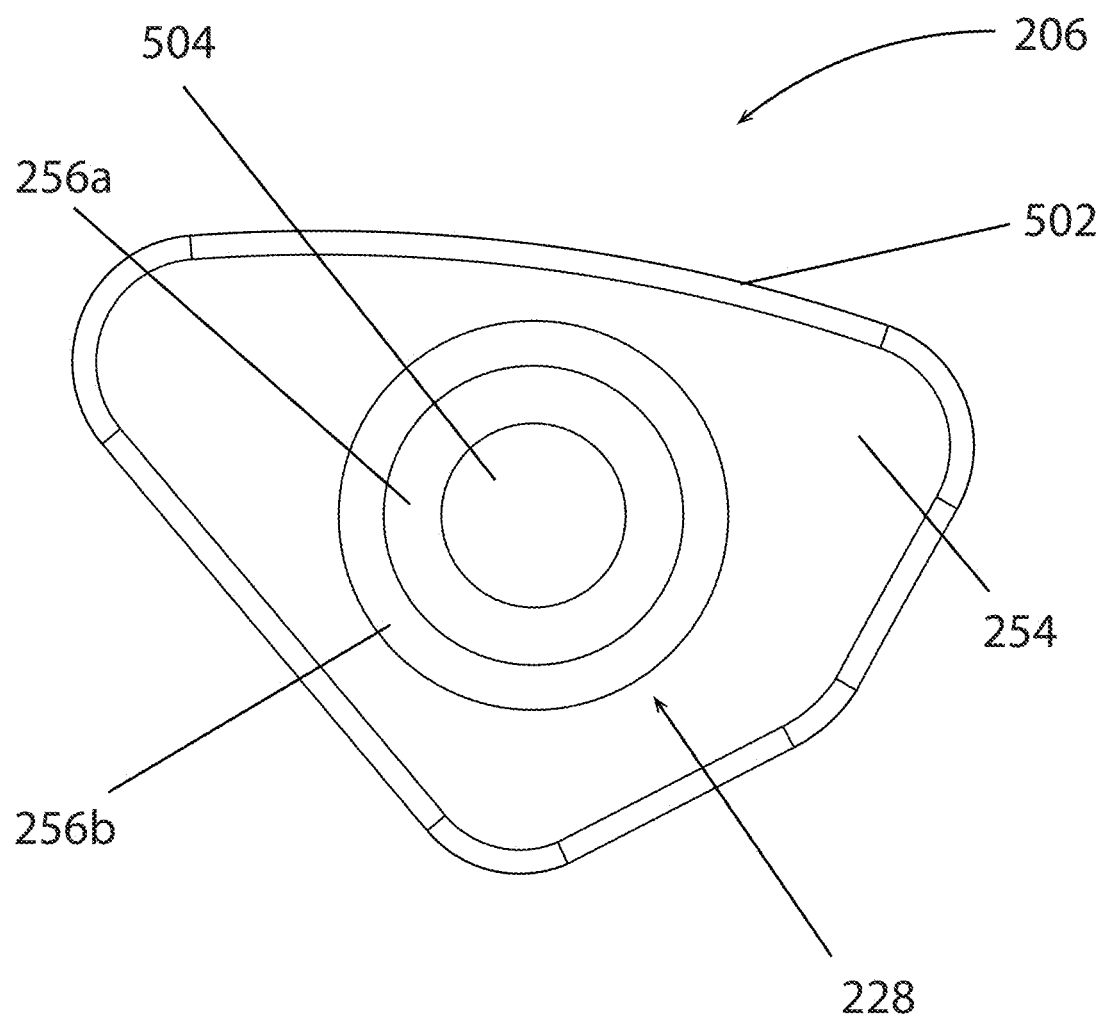

BASH GUARD DEVICE AND SYSTEM FOR BICYCLE COMPONENTS

PRIORITY

This application claims priority to U.S. Provisional Application Ser. No. 63/138,013, filed on Jan. 15, 2021, which is incorporated herein by reference in its entirety.

BACKGROUND

Generally, a bash guard, sometimes referred to as a cover or bash ring, is used to protect components of a bicycle from damage in case the bicycle is involved in a crash or the component is struck by an object on the ground or trail. Typically, the components protected are components of the drive train of the bicycle, such as the chainring and the chain. Bash guards are most commonly found on mountain bikes, as the chainring and chain of the bicycle are more likely to be hit by miscellaneous objects such as rocks, logs, and twigs.

Bash guards may be attached to a frame mount that is secured to the bicycle frame. These types of mountings have several limitations. A bash guard mounted to a frame mount may not rotate with the chainring, thereby potentially interfering with the operation of the bicycle drive train and/or providing imprecise protection of appropriate elements.

SUMMARY

In one example, a chainring protection system includes a chainring having a torque input section and a torque output section. The torque output section is radially outer relative to the torque input section and has a plurality of teeth. The chainring protection system also includes a cover connected to the chainring, such that the cover at least partially covers a circumferential portion of the torque output section of the chainring. The circumferential portion of the torque output section includes less than all teeth of the plurality of teeth.

In one example, the cover is a first cover, and the circumferential portion is a first circumferential portion. The chainring protection system further includes a second cover connected to the chainring, such that the second cover covers a second circumferential portion of the torque output section of the chainring.

In one example, the first cover at least partially covers a first group of teeth of the plurality of teeth, and the second cover at least partially covers a second group of teeth of the plurality of teeth. The second group of teeth is different than the first group of teeth.

In one example, the second cover is connected to the chainring, such that the second cover is opposite the first cover.

In one example, the chainring protection system further includes a backplate. The cover is configured to interface with the backplate, such that the cover is connected to the chainring.

In one example, the chain ring includes at least one vacancy. The backplate and the cover interface via a vacancy of the at least one vacancy.

In one example, the chainring further includes a flange disposed around and extending into the vacancy. The backplate is supported within the vacancy by the flange.

In one example, the chainring protection system further includes a fastener configured to connect the backplate to the cover, such that the cover is connected to the chainring via the flange around the vacancy.

In one example, the chainring protection system further includes a fastener. The chain ring includes at least one vacancy. The cover includes a threaded opening. The fastener is configured to directly connect the cover to the chain ring via a vacancy of the at least one vacancy and the threaded opening of the cover.

In one example, a cover for a chainring of a bicycle includes a body including a circumferential portion and at least one radial portion. The at least one radial portion extends radially inner relative to the circumferential portion. The cover further includes an opening extending at least partially through a radial portion of the at least one radial portion, and a raised surface at least partially surrounding the opening. The raised surface is positionable within a vacancy of a chain ring.

In one example, the cover further includes a threaded insert positioned within the opening.

In one example, the threaded insert is made of a metal material, and the body is made of a non-metal material.

In one example, the opening is a tapped hole.

In one example, the body is made of a metal material.

In one example, the raised surface completely surrounds the opening.

In one example, the opening is a first opening, and the radial portion is a first radial portion. The at least one radial portion of the body includes two radial portions. The cover further includes a second opening extending at least partially through a second radial portion of the two radial portions. The first radial portion and the second radial portion of the body extend radially inner relative to the circumferential portion at opposite sides of the circumferential portion, respectively.

In one example, the body has an outboard side and an inboard side opposite the outboard side. The outboard side is outboard relative to a frame of the bicycle when the cover is attached to the chainring. The opening extends from the inboard side partially into the radial portion of the body.

In one example, the body also has a front side extending between the outboard side and the inboard side. The circumferential portion of the body has a radially outer side, and the radial portion of the body has a radially inner side. The radially inner side of the radial portion is radially inner relative to the radially outer side of the circumferential portion. The cover further includes a chamfer feature at the outboard side and the front side of the body, and the radially inner side of the radial portion.

In one example, the chamfer feature is a first chamfer feature. The cover further includes a second chamfer feature at the inboard side and the front side of the body, and the radially outer side of the circumferential portion.

In one example, a chainring protection system includes a chainring having a torque input section, a torque output section, and at least two openings through the chainring. The torque output section is radially outer relative to the torque input section and includes a plurality of teeth. The chainring protection system also includes at least two covers connected to the chainring. A first cover of the at least two covers at least partially covers a first group of teeth of the plurality of teeth, and a second cover of the at least two covers at least partially covers a second group of teeth of the plurality of teeth. The chainring protection system also includes at least two fasteners configured to connect the first cover and the second cover to the chainring via a first opening of the at least two openings and a second opening of the at least two openings, respectively.

BRIEF DESCRIPTION OF DRAWINGS

FIG. 4C is a perspective view of a bash guard of FIG. 2;

FIG. 6A is a front view of a backplate of FIG. 2;

Other aspects and advantages of the embodiments disclosed herein will become apparent upon consideration of the following detailed description, wherein similar or identical structures have similar reference numerals.

DETAILED DESCRIPTION

The present disclosure provides examples of bash guard devices and systems that solve or improve upon one or more of the above-noted and/or other disadvantages with prior known bash guard devices. The present disclosure provides a bash guard or cover that assembles to a chainring through windows of the chainring, such that the bash guard rotates with the chainring. The bash guard itself may include threads or threaded inserts allowing for backplates and fasteners to secure the bash guard to the chainring, from the other side of the chainring. The present disclosure may integrate the bash guard into an outboard side of the chainring, which may allow a user to have a ready-protected chainring. The bash guard may be easily removed to provide a fully functioning chainring. Further, the bash guard may be removed without removing the crankset/crank assembly.

Various embodiments of the invention will be described herein with reference to the drawings. It will be understood that the drawings and the description set out herein are provided for illustration only and do not limit the invention as defined by the claims appended hereto and any and all their equivalents. For example, the terms "first" and "second", "front" and "rear", "left" and "right" are used for the sake of clarity and not as terms of limitation. Moreover, the terms referred to bicycle mechanisms conventionally mounted to a bicycle and with the bicycle orientated and used in a typical fashion unless otherwise indicated.

Figure 1:
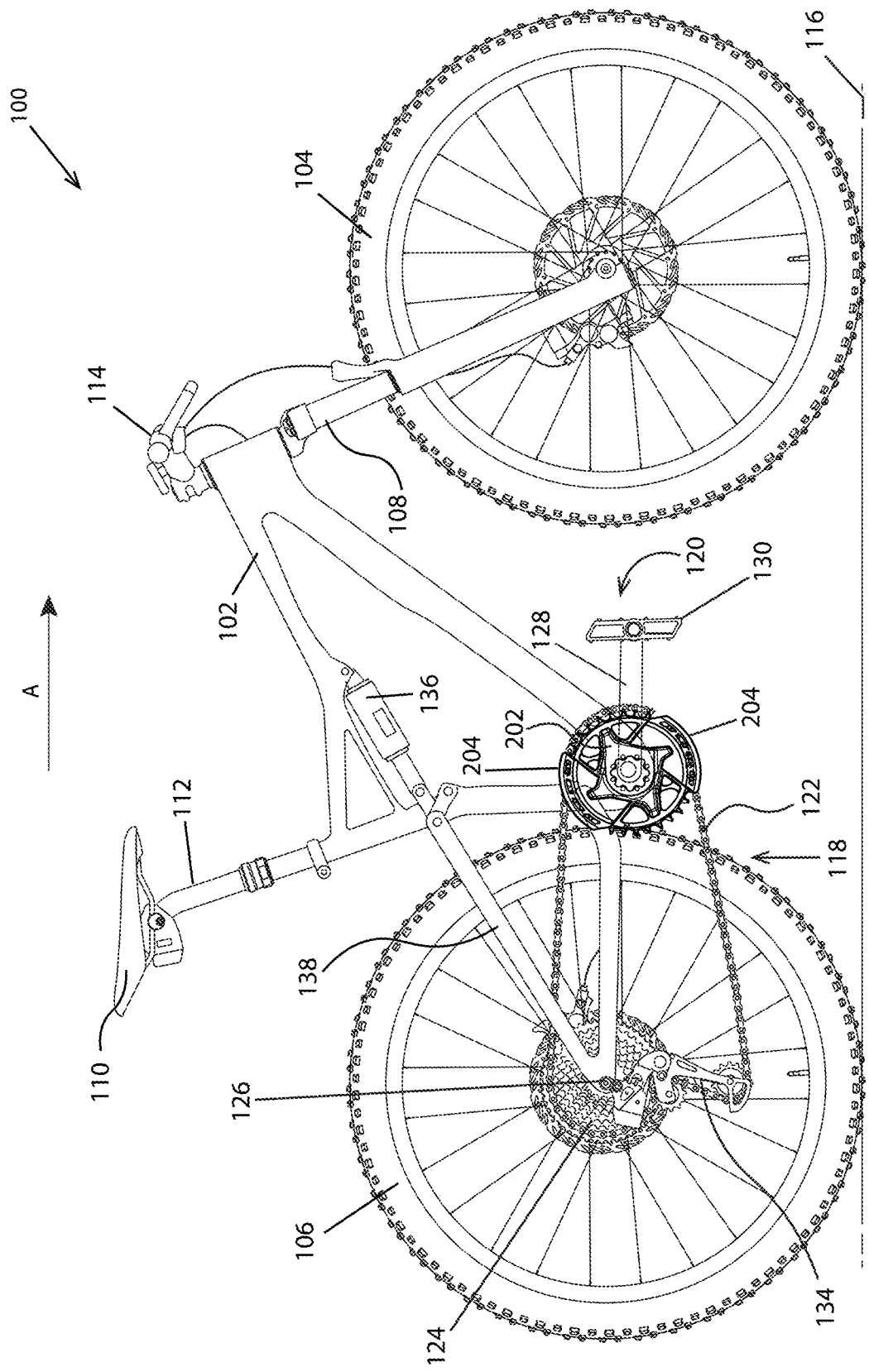
FIG. 1 is a side view of a bicycle according to an embodiment.

In the illustrated example of FIG. 1, a bicycle 100 includes a seat 110 coupled to a frame 102 (e.g., near a rear end of the frame 102 relative to a forward direction A) via a seat post 112. The bicycle 100 also includes handlebars 114 coupled to the frame 102 and a front fork 108 (e.g., near a forward end of the frame 102 relative to the forward direction A) for steering the bicycle 100. A front wheel 104 of the bicycle 100 is at the forward end of the frame 102. The bicycle 100 is shown on a riding surface 116. The riding surface 116 may be any riding surface such as the ground (e.g., a dirt path, a sidewalk, a street, etc.), a man-made structure above the ground (e.g., a wooden ramp), and/or any other surface.

In the illustrated example, the bicycle 100 has a drivetrain 118 that includes a crank assembly 120. The crank assembly 120 is operatively coupled via a chain 122 to a rear sprocket assembly 124 mounted to a hub 126 of the rear wheel 106. The crank assembly 120 includes at least one crank arm 128 (e.g., two crank arms) and at least one pedal 130 (e.g., two pedals), along with a front sprocket assembly having at least one front sprocket, or chainring 202. A rear gear change device 134, such as a derailleur, is disposed at the rear wheel 106 to move the chain 122 through different sprockets of the rear sprocket assembly 124. Additionally or alternatively, the bicycle 100 may include a front gear change device to move the chain 122 through gears on the front sprocket assembly if the front sprocket assembly includes more than one front sprocket or chainring.

Located on the chainring 202 are two bash guards 204 that nest in and around an outboard side of the chainring 202. The two bash guards 204 protect areas of the chain 122 and the chainring 202 that are most likely to be impacted by debris during a ride. Two backplates, for example, are associated with each of the two bash guards 204. The two backplates attach to an inboard side of the chainring 202 via molded insert threads within the respective bash guard 204, which is outboard relative to the two backplates and the chainring 202. The respective bash guard 204 and the two associated backplates may be secured together by fasteners.

The example bicycle 100 shown in FIG. 1 includes a suspension system having one or more suspension components. In this example, the front fork 108 is implemented as a front suspension component. Further, in the illustrated example, the bicycle 100 includes a rear suspension component 136. The rear suspension component 136 is, for example, a rear shock absorber. The rear shock absorber 136 is coupled between two portions of the frame 102, one being, for example, a swing arm 138 coupled to the rear wheel 106. The front fork 108 and the rear shock absorber 136 absorb shocks and vibrations while riding the bicycle 100 (e.g., when riding over rough terrain). In other examples, the front fork 108 and/or the rear shock absorber 136 may be integrated into the bicycle 100 in other configurations or arrangements. Further, in other examples, the suspension system may employ only one suspension component (e.g., only the front fork 108) or more than two suspension components (e.g., an additional suspension component on the seat post 112) in addition to or as an alternative to the front fork 108 and the rear shock absorber 136.

While the example bicycle 100 shown in FIG. 1 is a type of mountain bicycle, the example components disclosed herein may be implemented on other types of bicycles. For example, the disclosed components may be used on road bicycles, as well as bicycles with mechanical (e.g., cable, hydraulic, pneumatic, etc.) and non-mechanical (e.g., wired, wireless) drive systems. The disclosed components may also be implemented on other types of two-wheeled, three-wheeled, and four-wheeled human powered vehicles. Further, the example components may be used on other types of vehicles, such as motorized vehicles (e.g., a motorcycle, a car, a truck, etc.).

It is to be understood that the specific arrangement and illustrated components of the frame 102, the front wheel 104, the rear wheel 106, and the drivetrain 118 are nonlimiting to the disclosed embodiments. Further, although not specifically mentioned, the bicycle 100 may use at least one of hydraulic rim brakes, hydraulic disc brakes, mechanical rim brakes, or mechanical disk brakes, as well as other electronic, hydraulic, pneumatic, and mechanical systems, or combinations thereof.

Figure 2:
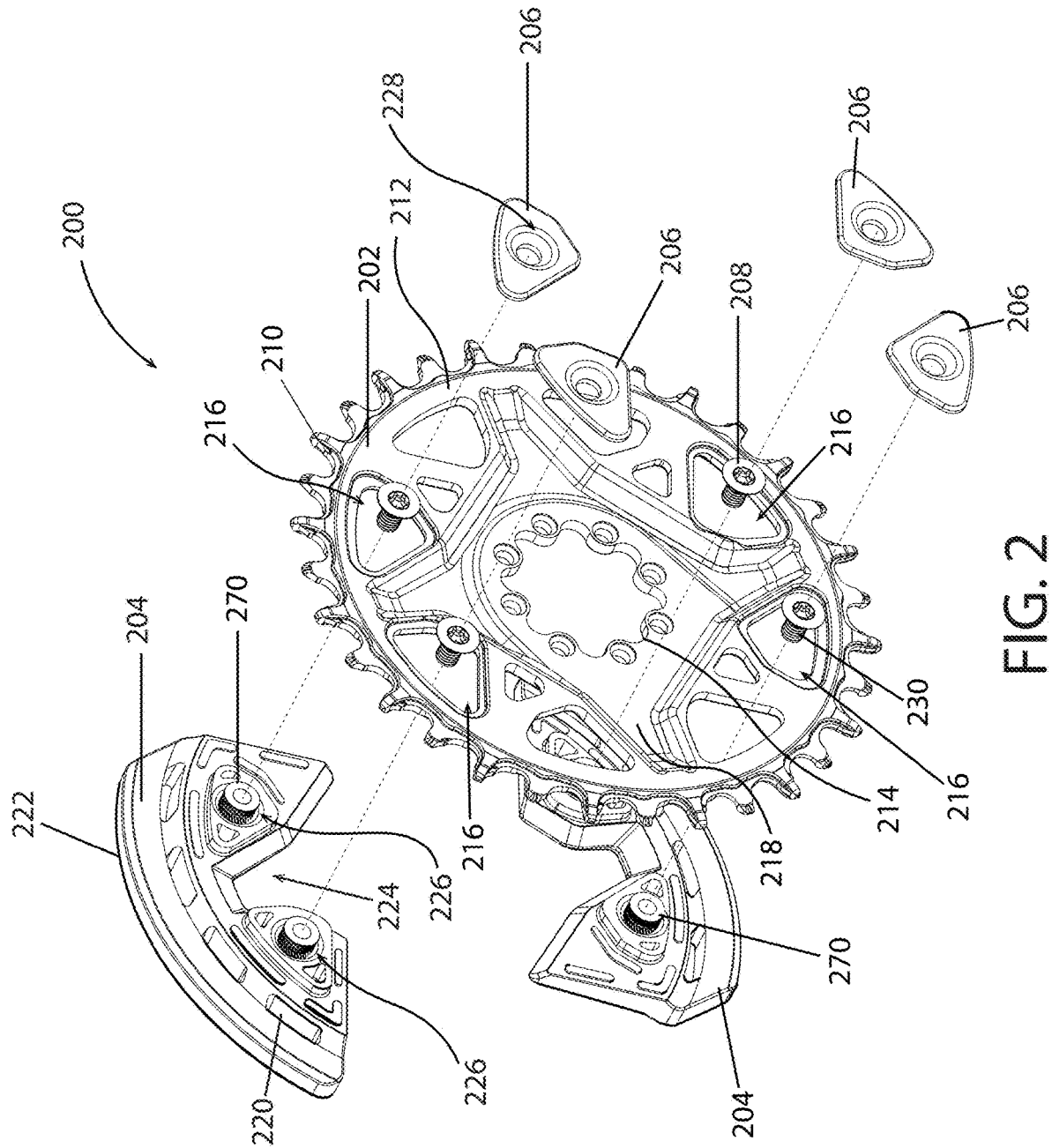
FIG. 2 is an exploded perspective view of a chainring protection system according to a first embodiment.
Figure 3B:
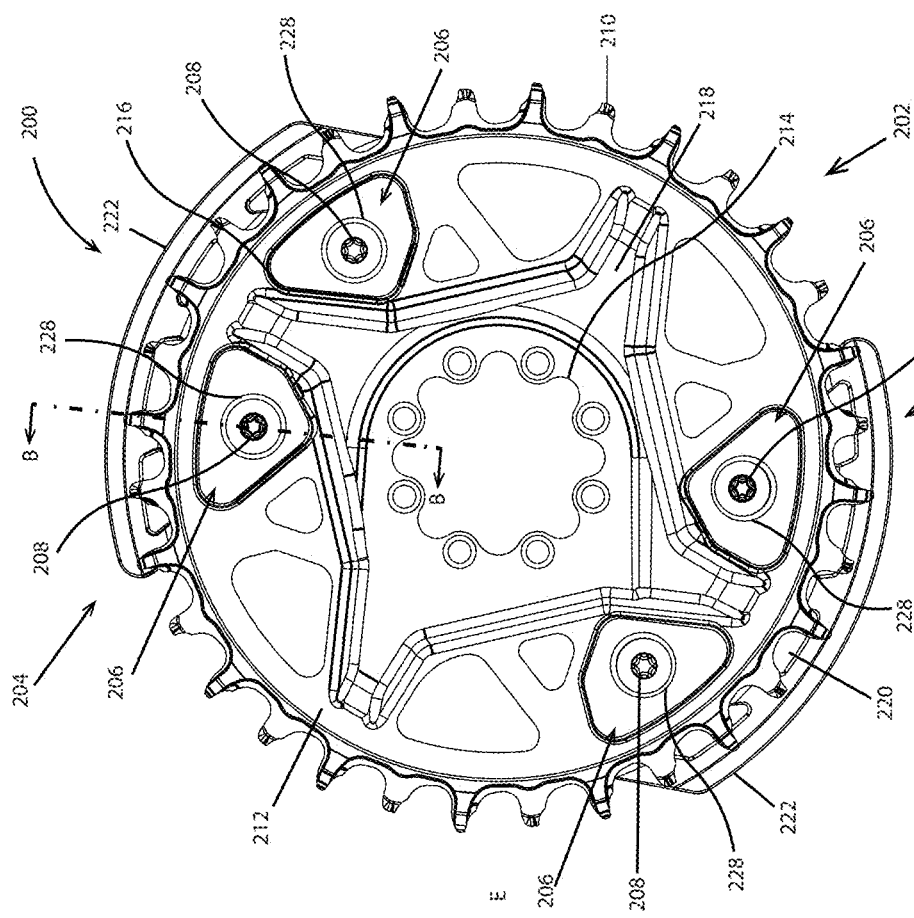
FIG. 3B is a rear view of the chainring protection system of FIG. 2 assembled.
Figure 3A:
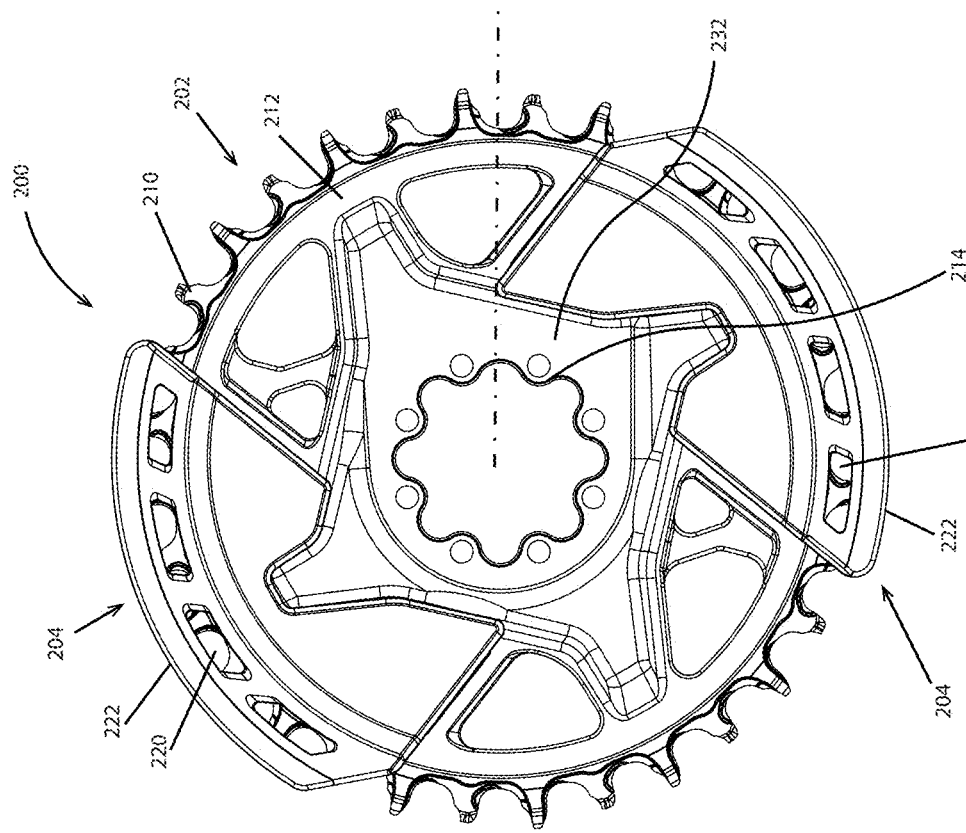
FIG. 3A is a front view of the chainring protection system of FIG. 2 assembled.

FIG. 2 is an exploded perspective view of an example chainring protection system 200, according to a first embodiment. FIGS. 3A and 3B are front and rear views of the chainring protection system 200 assembled, respectively. The embodiment illustrated in FIGS. 2, 3A, and 3B include a chainring 202, two bash guards 204, four backplates 206, and four fasteners 208. The chainring 202 includes teeth 210. The teeth 210 may not all be identical. For example, the teeth 210 around the chainring 202 may vary in height, thickness, shape, etc. The teeth 210 are configured to interact with the chain 122 of the bicycle 100.

In the embodiment, the chainring 202 includes a torque output section 212 including the teeth 210 configured as a sprocket, for example, a power output sprocket for the chainring 202. The chainring 202 also includes a torque input section 214 that is attachable to the crank assembly 120 of the bicycle 100.

In the embodiment, the torque output section 212 and the torque input section 214 of the chainring 202 are formed as a unitary single piece. As shown in FIGS. 2 and 3B, viewing the chainring 202 from the rear, the chainring 202 includes a debossed portion 218. As shown in FIG. 3A, when viewing the chainring 202 from the front, opposite the debossed portion 218 of the chainring 202, the chainring 202 includes an embossed portion 232. The embossed portion 232 and debossed portion 218 are optional features. Further, the chainring 202 includes windows 216 (e.g., vacancies or openings). In the present embodiment, there are a total of twelve windows, however there are four windows 216 for attaching the bash guards 204 to the chainring 202. In an alternate embodiment, there may be more windows (e.g., sixteen windows) or fewer windows (e.g., four windows) and there may be more (e.g., six) or fewer (e.g., two) windows used for attaching the bash guards to the chainring.

In the embodiment, the bash guard 204 includes an outer edge 222 (e.g., a radially outer edge) and an inner edge 224 (e.g., a radially inner edge). In the present embodiment, the outer edge 222 has a rounded curvature that follows a radially outer curve of the chainring 202. The inner edge 224 may follow a contour of the embossed portion 232 and fit with a protruding surface of the embossed portion 232. In alternate embodiments, the outer edge and the inner edge may take on different shapes. In the present embodiment, the bash guard 204 includes bash-guard openings 226 that may include threads and/or threaded inserts 270, respectively. The threaded inserts 270 may be molded into the bash guard 204. In an embodiment, the outer edge 222 is a tooth protective portion configured to protect teeth of a chainring from impact.

The backplates 206 have backplate openings 228, through which the fasteners 208 may extend. During assembly, the bash guards 204 are placed on the outboard side of the chainring 202 and the backplates 206 are placed on the inboard side of the chainring 202. The fasteners 208, having threads 230, secure the backplates 206 to the bash guards 204 by extending through the backplate openings 228 and are secured in the threaded inserts 270, respectively. The fasteners 208 may be any fastener available to secure the backplate 206 to the bash guard 204. The fasteners 208 may include nuts, screws and/or bolts (e.g., M5 bolts). Alternatively, the bash guard 204 and the backplate 206 may be secured together in any number of other ways (e.g., bolting, screwing, clamping, gluing, etc.).

The backplates 206 may be sized and shaped to mate with and fill corresponding windows 216, respectively. For example, the chainring 202 may include extensions (e.g., lips or flanges) that extend around perimeters of the windows 216, respectively. The backplates 206 may abut the flanges around the windows 216, respectively, such that when the backplates 206 are secured to the bash guards 204, respectively, the backplates 206 are supported by the flanges around the windows 216, respectively, are flush with one or more portions of the chainring 202.

The bash guards 204 are shown having openings 220 (e.g., gaps or through-holes). The openings 220 may be sized and shaped to follow the rounded curvature of the outer edge 222 of the bash guard 204. In the present embodiment, the bash guard 204 includes four openings 220. In one embodiment, the bash guard 204 include more (e.g., six openings 220), fewer (e.g., a single continuous opening 220), and/or different openings 220 through the bash guard 204. In another embodiment, the bash guard 204 does not include any openings 220.

In an alternate embodiment, the backplate openings 228 may be threaded. In yet another alternate embodiment, more or fewer bash guards 204, windows 216, backplates 206, fasteners 208, and/or threaded inserts 270 may be provided. For example, another embodiment of a chainring protection system may include four bash guards 204, eight windows 216, eight backplates 206, eight fasteners 208, and eight threaded inserts 270.

An axis E is shown in FIG. 3A. The axis E represents a centerline of the crank arm 128. Thus, the crank arm 128 may be located along the axis E. When counting in a counterclockwise direction from the axis E, the protected areas of the bash guards 204 are the teeth 210 numbered 7-14 and 23-30 (e.g., circumferential portions). Generally, by not covering all of the teeth 210 of the chainring 202, and covering the likely impact zones of the chainring 202, the bash guards 204 are lighter in weight. In an alternate embodiment, more or less teeth 210 may be protected by the bash guards 204. In a further alternate embodiment, the bash guards 204 may protect a different set of teeth 210 on a different area of the chainring 202. In the embodiments of FIGS. 1, 2, 3A, and 3B, two bash guards 204 are shown. In an alternate embodiment, only one bash guard may be used, which may cover the same, more, or fewer teeth 210. In an alternate embodiment, the crank arm 128 may not be located along the axis E.

Figure 4A:
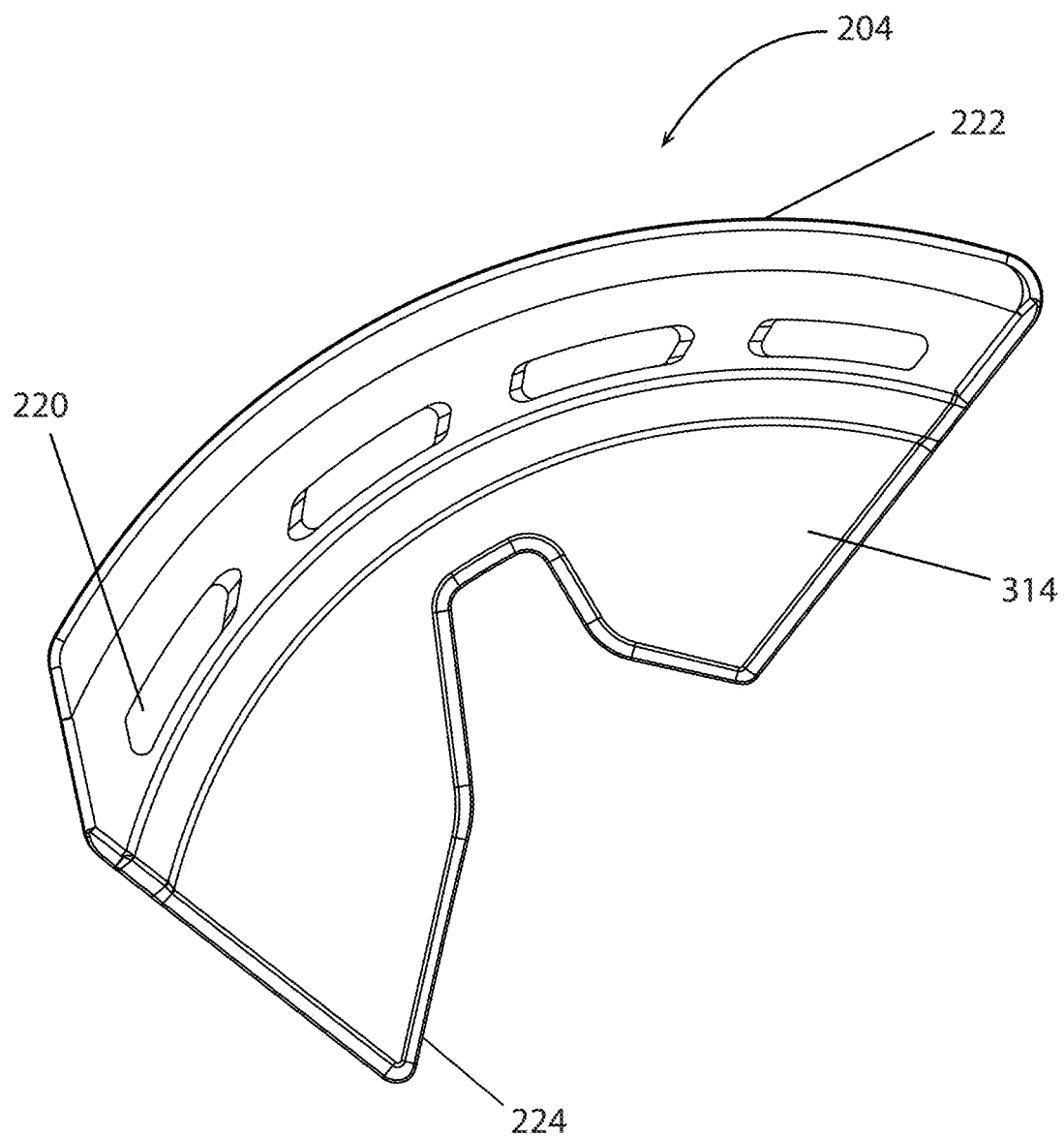
FIG. 4A is a front view of a cover or bash guard of FIG. 2.

FIG. 4A is a front view of a bash guard 204. From the front, the bash guard 204 has a flat outer surface 314 radially inward from the openings 220 and radially outward from the inner edge 224. Thus, the fasteners 208 and the bash-guard openings 226 (see FIG. 4C) are depicted in the example as extending into the bash guard 204 and/or the threaded insert 270, but do not extend all the way through the bash guard 204.

Figure 4B:
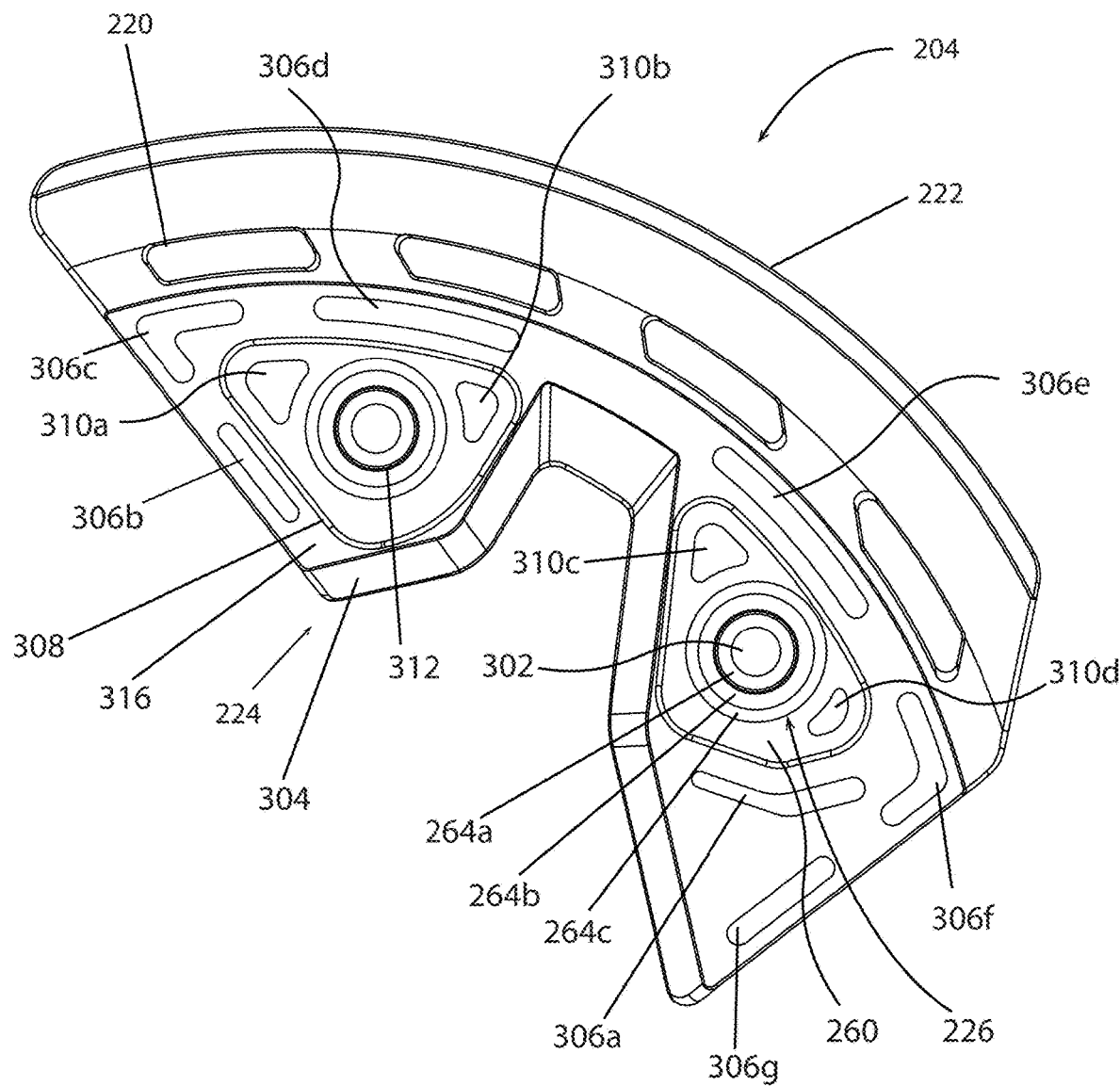
FIG. 4B is a rear view of a bash guard of FIG. 2.

FIG. 4B is a rear view of the bash guard 204, and FIG. 4C is a rear perspective view of the bash guard 204. The bash guard 204 includes a flat inner surface 316. Extending away from the flat inner surface 316 are two main protruding portions 260 (e.g., corresponding to the number of the fasteners 208) and several small protrusions 306a-306g (e.g., six small protrusions) that are located across the flat inner surface 316. The main protruding portions 260 and the small protrusions 306a-306g are raised surfaces that may interface with the backplates 206 and/or the chainring 202. Some of the small protrusions 306a-306g are located adjacent to a perimeter of the flat inner surface 316, though the small protrusion 306a is located closer to one of the main protruding portions 260. The small protrusions 306a-306g generally include rounded edges, and have a curved, straight, or angled shape. Further, at least one of the small protrusions 306a-306g generally follows the direction and/or orientation of a wall of the main protruding portion 260. For example, the small protrusion 306d matches a curve and orientation of a wall of the main protruding portion 260 closest to the small protrusion 306d. In other embodiments, more, fewer, and/or differently shaped and/or oriented small protrusions 306 may be provided.

The main protruding portions 260 each have a perimeter 308. The perimeter 308 has rounded edges in the present embodiment and may be generally triangular and/or angular in shape. Different main protruding portions 260 may have different sized and/or shaped perimeters. Alternatively, different main protruding portions 260 may each have a same size and shape perimeter.

Generally, the main protruding portion 260 and the perimeter 308 may be sized and shaped to fit within a corresponding window 216 of the chainring 202. The main protruding portions 260 may have at least one side/edge of the perimeter 308 that generally follows a shape and/or outline of one of the walls of the bash guard 204 (e.g., defining one of the windows 216). Further, the main protruding portions 260 may protrude a greater distance from the flat inner surface 316 than the small protrusions 306a-306g.

In the embodiment shown, the main protruding portions 260 include holes 310a-310d (e.g., through-holes). The holes 310a-310d are bean shaped or triangularly shaped. The holes 310a-310d are optional. Alternatively, the main protruding portion(s) 260 and the perimeter(s) 308 of the main protruding portion(s) 260, respectively, may take on any other shape and/or size, and the holes 310a-310d my take on any other shape and/or size. In one embodiment the main protruding portions 260 do not include any holes (i.e., 310a-310d).

Figure 9:
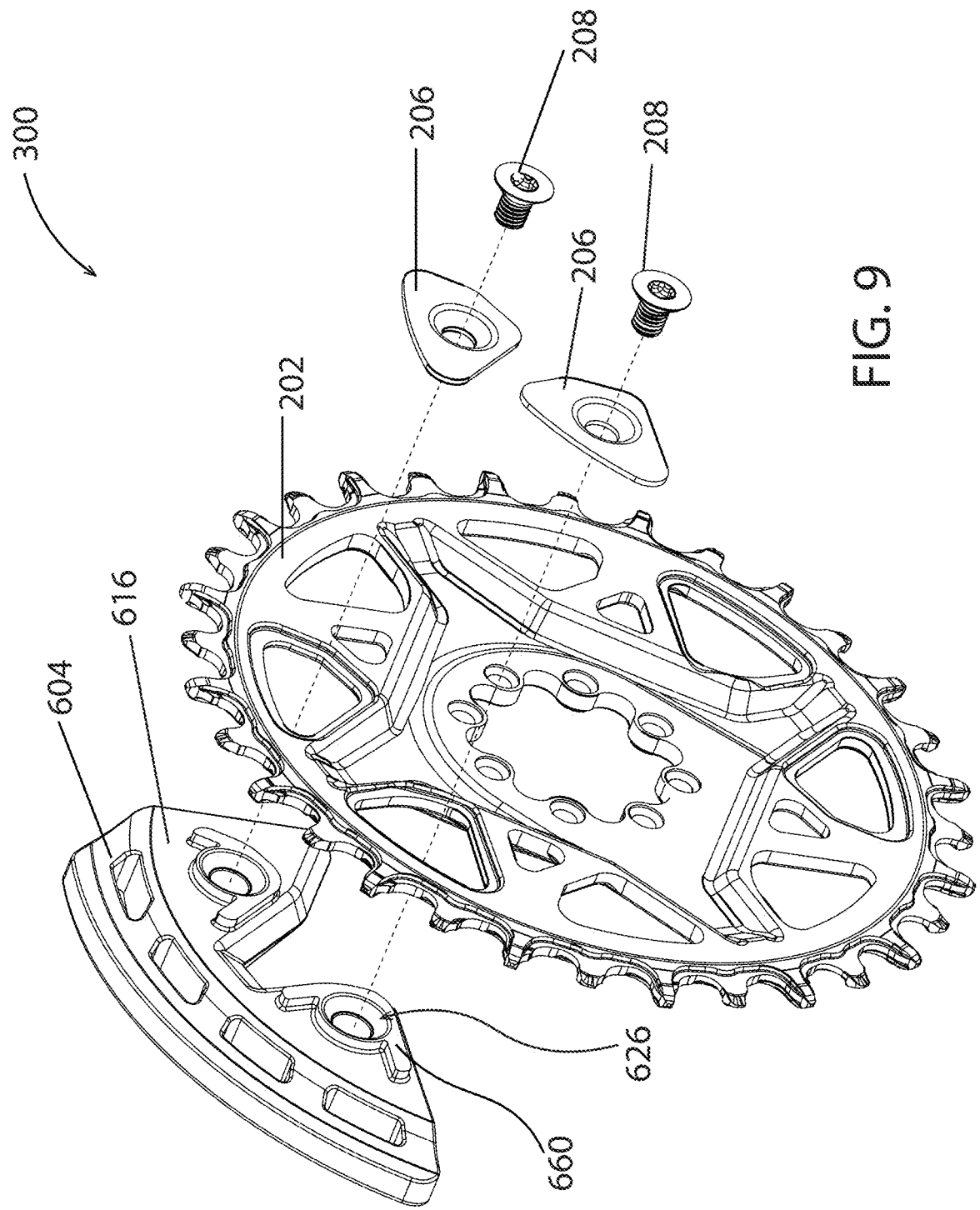
FIG. 9 is an exploded perspective view of a chainring protection system according to a second embodiment.

For example, FIG. 9 depicts an example chainring protection system 300, according to a second embodiment. FIG. 9 includes some of the same features of the chainring protection system 200, indicated by the same numbering. However, the chainring protection system 300 of FIG. 9 includes a bash guard 604 that differs from the bash guard 204 due to a different shape of main protruding portions 660. In the example of FIG. 9, the main protruding portions 660 are smaller, and shaped like a boomerang. The main protruding portion 660 is not sized and/or shaped to match the full shape of a corresponding chainring window 216, respectively, but does match the shape of part of the window 216. In an alternate embodiment, a main protruding portion of a bash guard may not match the size and/or shape of the window 216 at all. Further, in the embodiment, though openings 626 extend away from a flat inner surface 616, the main protruding portions 660 do not extend all the way around the openings 626, and instead, only partially surround the openings 626.

Returning to FIGS. 4B and 4C, the main protruding portions 260 include the bash-guard openings 226 in a generally central location, between the holes 310a-310d. The bash-guard openings 226 include an angled section 264 that includes a first surface 264a, a second surface 264b, a third surface 264c, a central hole 302, and a threaded region 312. In the example, the first surface 264a is a flat inner most surface of the bash-guard opening 226, adjacent to the central hole 302. In the embodiment, the threaded region 312 is adjacent to the first surface 264a. The threaded region 312 may optionally be included to secure the fasteners 208 or the threaded inserts 270 to the bash guard 204. Adjacent to the threaded region 312 is the second surface 264b. The second surface 264b may be an angled surface (e.g., angled relative to the first surface 264a) in order to help guide a fastener 208, a threaded insert 270, or a region of a backplate 206 into the bash-guard opening 226. Adjacent to the second surface 264b is third surface 264c. The third surface 264c may also be an angled surface (e.g., angled relative to the second surface 264b), with a less steep gradient than the second surface 264b. In an alternate embodiment, the third surface 264c is a flat surface rather than an angled surface and is of the same flatness and/or level as the remainder of the main protruding portion 260. In a further alternate embodiment, the bash-guard opening 226 may be located anywhere in relation to the respective main protruding portion 260 and the corresponding perimeter 308. In an additional further alternate embodiment, the angled section 264 does not include each and every one of the first surface 264a, the second surface 264b, and the third surface 264c. For example, the section 264 may not be angled in that the section 264 only includes the first surface 264a.

In the embodiment shown in FIGS. 4B and 4C, the inner edge 224 includes a surface 304. The surface 304 may be an angled surface that fits a contour of the embossed portion 232 of the chainring 202. The angling of the surface 304 may be useful in this particular embodiment because the embossed portion 232 is also angled (See FIG. 5A). Therefore, the angling of the surface 304 may allow the bash guard 204 to rest against (e.g., abut) the embossed portion 232 more securely. In an alternate embodiment, the surface 304 and/or the embossed portion 232 of the chainring 202 is not angled. In other embodiments, the inner edge 224 may be any number of different shapes.

The bash guards 204 may be made of a composite material (e.g., glass-filled nylon). However, the bash guards 204 may be made of any number of other materials (e.g., carbon, plastics, polycarbonate, metals such as aluminum, etc.). The bash guards 204 may be injection molded. Alternatively, the bash guard 204 may be manufactured by any other known method. For example, the bash guard 204 may be manufactured by stamping or three-dimensional (3D) printing.

Figure 5A:
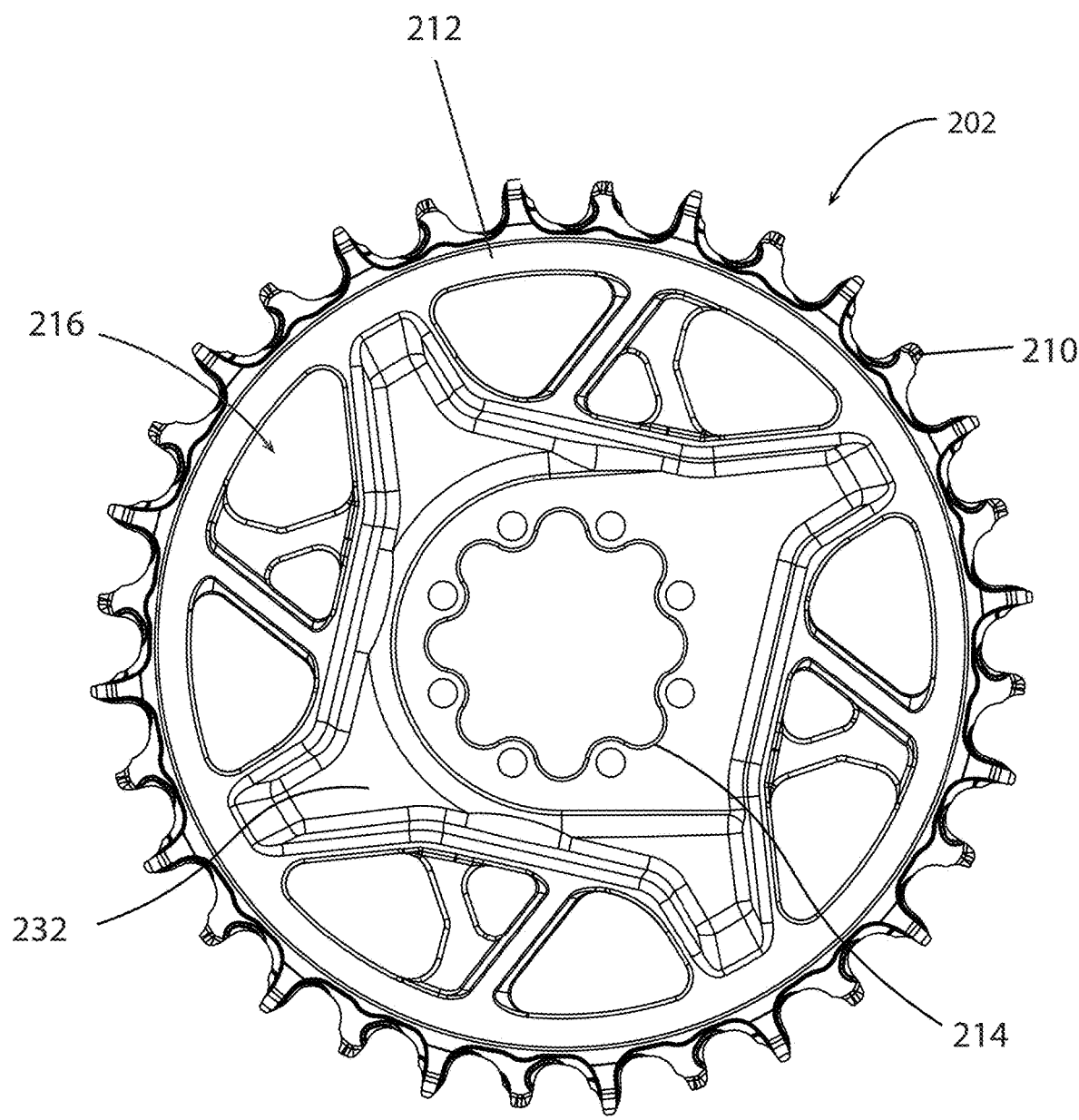
FIG. 5A is a front view of a chainring of FIG. 2.
Figure 5B:
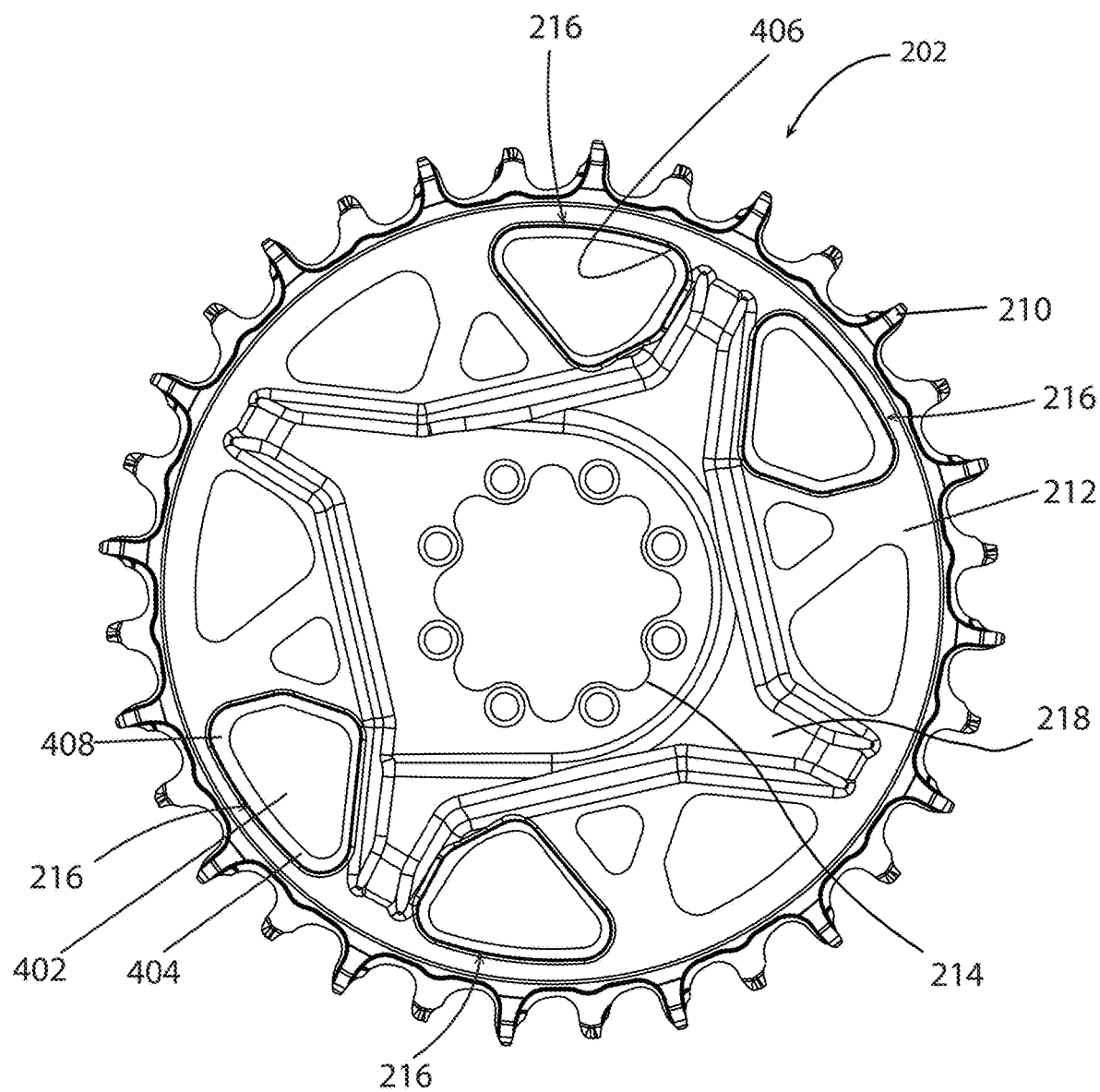
FIG. 5B is a rear view of a chainring of FIG. 2.

FIGS. 5A and 5B are front and rear views of the chainring 202, respectively. The chainring 202 may be a fully stamped chainring 202 made of, for example, steel or aluminum. Alternatively, the chainring 202 may be made of any number of other materials including, for example, another metal or carbon, manufactured using any known method.

The chainring 202 includes the windows 216 outside the embossed portion 232/debossed portion 218, but radially inward from the teeth 210. Referring to FIG. 5B, each of the windows 216 includes a window opening 402 and a pocket 404. The pocket 404 is created by the edge 406 of the window 216 and a surface 408 (e.g., a lip or flange) extending inward, towards the window opening 402, that allows the backplate 206 to rest within the window 216 without passing through the window 216. In manufacturing, the pocket 404 may be created by a stamped recess in the inboard side of the chainring 202. The pocket 404 may, however, be formed by any number of other known methods. A surface of the backplate 206 may rest against the surface 408, within the pocket 404. The design of the chainring 202 in the present embodiment allows for the chainring 202 to be a fully stamped chainring. In other embodiments, the windows 216, the window openings 402, and the pockets 404 may be any number of other shapes, and the chainring 202 may be manufactured by any number of other known methods.

Figure 6B:
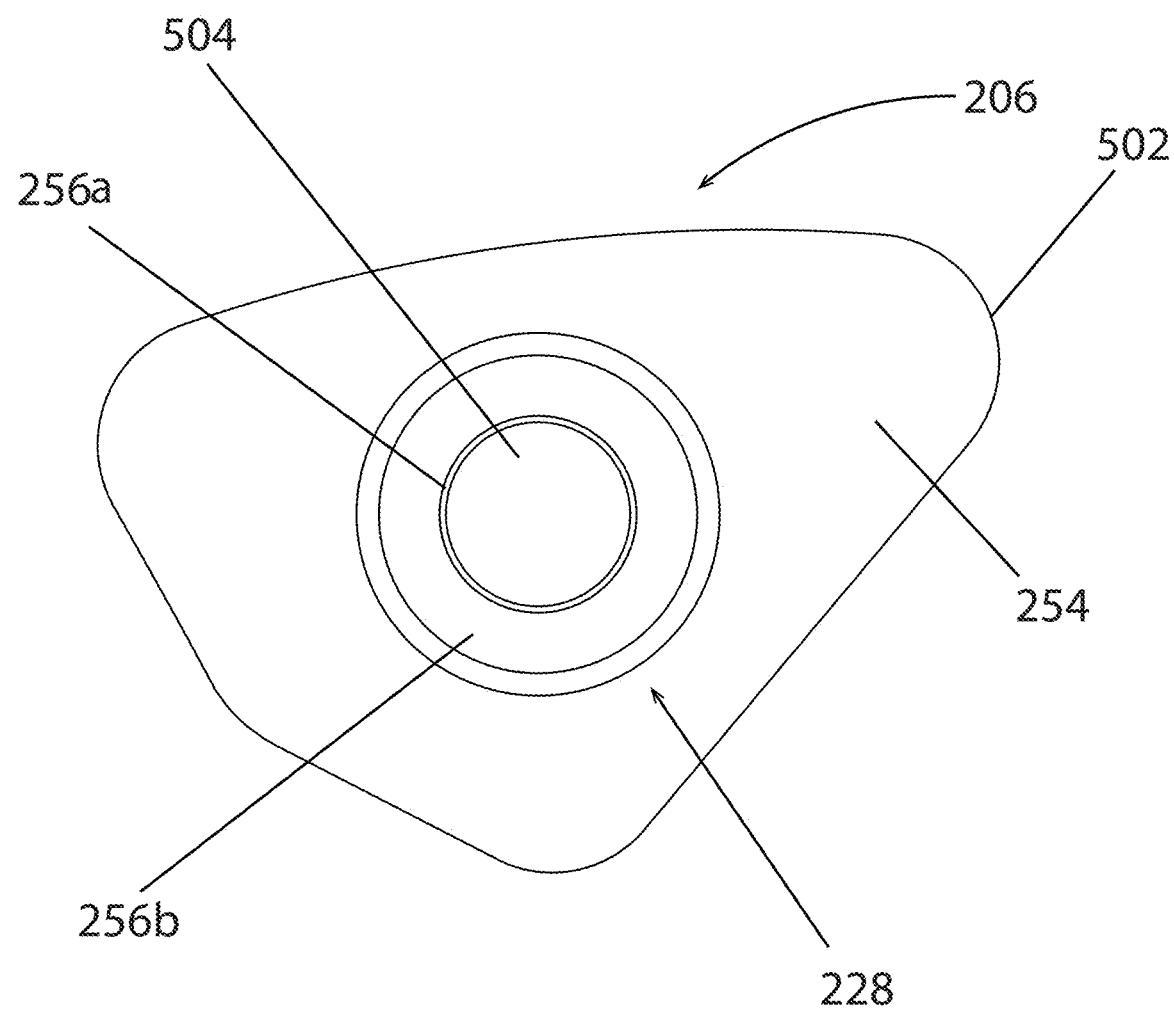
FIG. 6B is a rear view of a backplate of FIG. 2.

FIGS. 6A and 6B are front and rear views of a backplate 206. The backplate 206 includes a backplate perimeter 502 that is sized and shaped to fit within a window 216. In the present embodiment, the backplate perimeter 502 is made of the same material as the backplate 206 and has a flat edge. In an alternate embodiment, the backplate perimeter 502 may have an angled edge or rounded edge, and/or may be made of a different material in order to nest better within the window 216 of the chainring 202. The backplate 206 includes a flat region 254 and an inner region 256. A portion of the flat region 254 may rest against the surface 408 of the window 216 of the chainring 202. In one embodiment, the backplate 206 includes an extension around the backplate perimeter 502 that interfaces with the surface 408 of the window 216 of the chainring 202.

The inner region 256 and a backplate hole 504 (e.g., through-hole) form the backplate opening 228. The inner region 256 may include a tapered region 256b and a straight region 256a. The tapered region 256b is shown in FIG. 6A as tapering inward, extending three-dimensionally into the page. The tapered region 256b is shown in FIG. 6B as tapering outward, extending three-dimensionally out of the page. In the present embodiment, the straight region 256a is a smooth flat section that surrounds the backplate hole 504. The tapered region 256b is adjacent to the straight region 256a and guides a fastener 208 to the backplate hole 504. In one embodiment, the inner region 256 does not include a tapered region 256b (e.g., only includes the straight region 256a). In another embodiment, the inner region 256 includes more than one tapered region 256b (e.g., at different angles relative to the straight region 256a).

In an alternate embodiment, the backplate 206 may be any shape. In the present embodiment the backplate 206 may be made of a metal, such as steel or aluminum. In an alternate embodiment, however, the backplate may be made of another material capable of providing the rigidity and stiffness necessary to keep from deforming and traveling through the window 216 of the chainring 202 (e.g., carbon, plastic, etc.).

Figure 7:
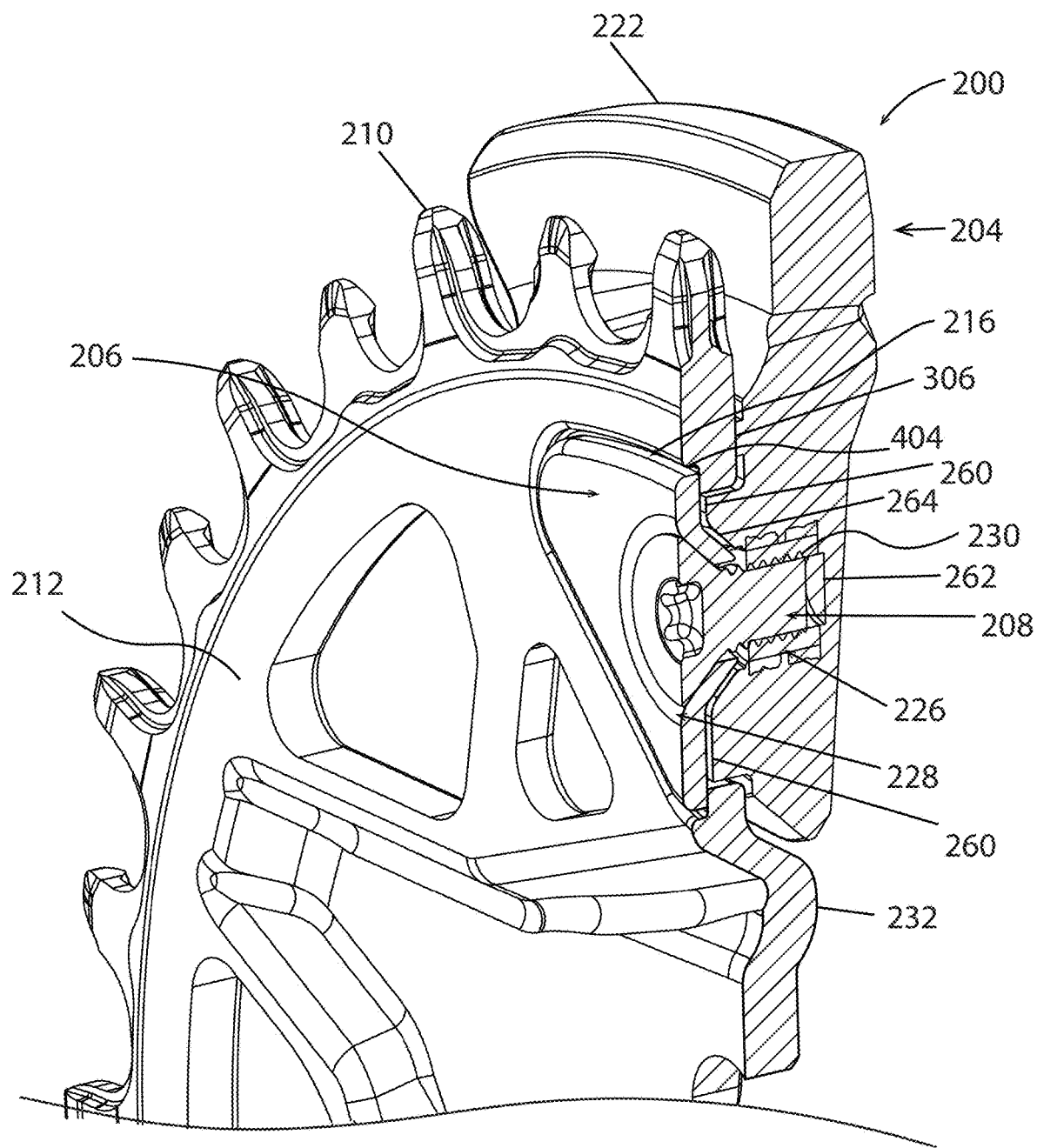
FIG. 7 is a perspective sectional view of the chainring protection system of FIG. 2 assembled, taken along cross section B-B as shown in FIG. 3B.
Figure 8:
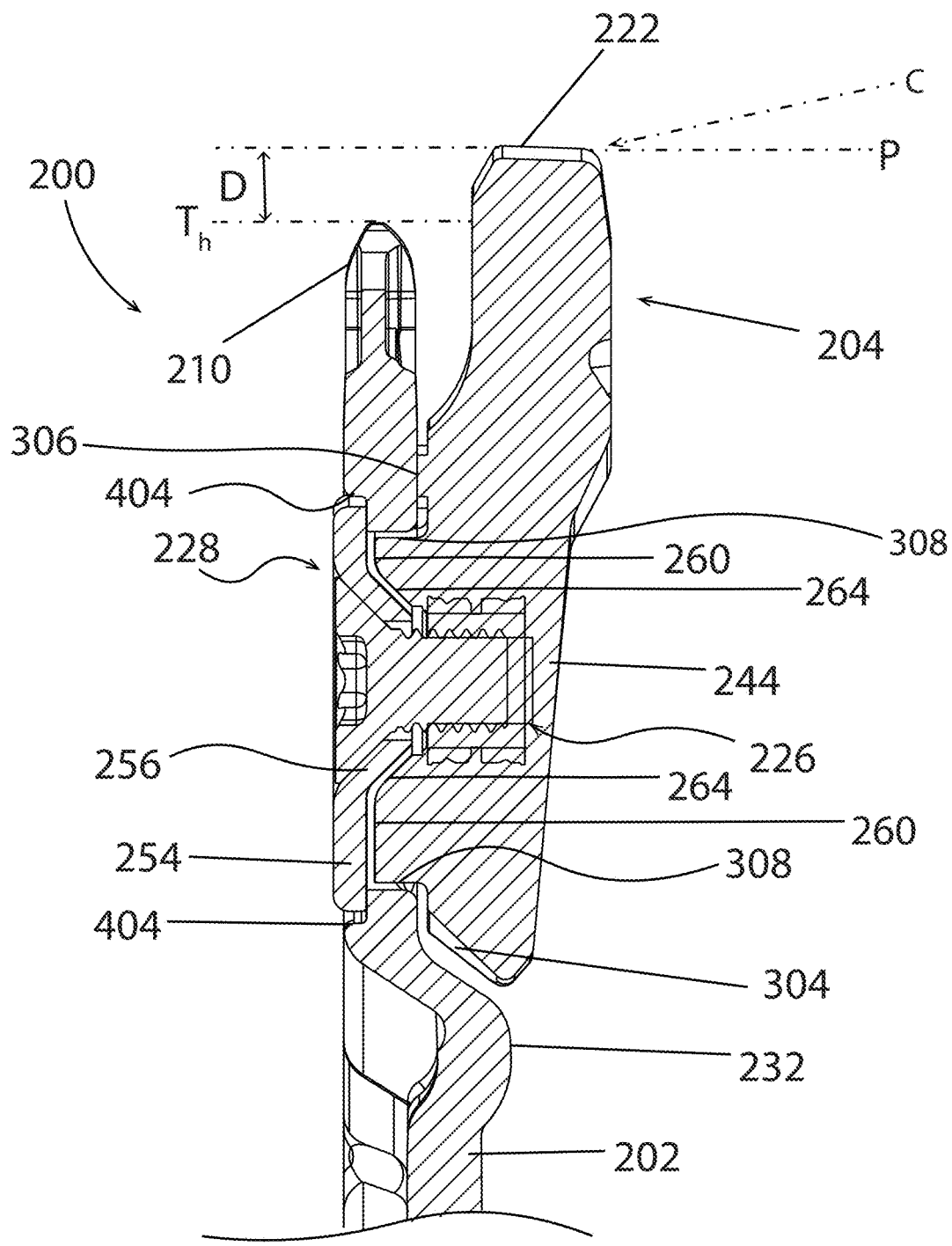
FIG. 8 is a sectional view of the chainring protection system of FIG. 2 assembled, taken along cross section B-B shown in FIG. 3B.

FIG. 7 is a perspective sectional view of the chainring protection system 200 taken along cross section B-B shown in FIG. 3B, and FIG. 8 is a sectional view of the chainring protection system 200 taken along the cross-section B-B. When the chainring protection system 200 is assembled, the backplate 206, the chainring 202, and the bash guard 204 may fit together in a tight and compact manner. In an alternate embodiment, the backplate 206, the chainring 202, and the bash guard 204 may be assembled loosely, having a clearance fit.

As shown in FIGS. 7 and 8, the fastener 208 secures the backplate 206 to the bash guard 204. The backplate 206 fits snugly in the pocket 404 of the chainring 202. The chainring 202 fits securely against the bash guard 204, sitting against the perimeter 308 of the main protruding portions 260 and supported by at least one small protrusion 306 of the flat inner surface 316. The inner region 256 of the backplate 206 rests against the angled section 264 of the bash guard 204. The flat region 254 of the backplate 206 rests against the main protruding portion 260 of the bash guard 204.

The back of the central hole 302 of the bash guard opening 226 may be a square opening 262 that receives the fastener 208 and/or the threaded insert 270. The angled surface 304 of the inner edge 224 of the bash guard 204 may be shaped to match the embossed portion 232 of the chainring 202.

As shown in FIG. 8, the bash guard 204 varies in thickness, having a number of different thicknesses at different locations on the bash guard 204. In the present embodiment, a thin portion 244 may be located behind the square opening 262 and may be thinner than most of the bash guard 204, but not all. In another embodiment, the thin portion 244 may be the thinnest portion of the bash guard 204.

Vertically, the tallest point of the bash guard 204 (e.g., the outer edge 222 when at a topmost position during rotation of the chainring 202 and the bash guard 204) is shown along a plane P. The tallest point of the teeth 210 of the chainring 202 is shown by a plane $T_h$. The bash guard 204 extends a distance D above the plane $T_h$. The teeth 210 may, however, have varying heights. Thus, the distance D may vary depending on the height of a particular tooth. The distance D may be between 2-5 mm, depending on the tooth height. Specifically, the distance D may be between 3-4 mm. For one tooth of the teeth 210, the distance D may be 3.3 mm. Other distances dimensions for the bash guard 204 and the distance D may be provided.

The distance D to be provided for protection of the chain 122 may be determined by a number of factors. For example, the distance D may be determined based on a certain amount of clearance to be provided for the chain 122, as well as an angle of impact of an object C. For example, the distance D may be tall enough to protect the teeth 210 from objects traveling at various angles. Specifically, the distance D may be tall enough to protect the teeth 210 from objects approaching the chainring protection system 200 within a predetermined angle. For example, protection may be provided against an object approaching the chainring protection system 200 at an angle of between 0-20 degrees from a horizontal reference, such as plane $T_h$. In another embodiment, the distance D may be adapted such that the distance is tall enough to protect the teeth 210 from objects traveling at an angle between 0-10 degrees from a horizontal reference. In an alternate embodiment, the horizontal reference may be plate P. When an object C hits the bash guard 204, for example, at the outer edge 222, the load of the impact may transfer through the bash guard 204 to the main protruding portion 260.

In the chainring protection system 200, the securing of the backplate 206 to the bash guard 204 through a window 216 of the chainring 202 allows for a user to easily mount the bash guard 204 on the chainring 202 without needing to take the chainring 202 off the bicycle 100.

Figure 10:
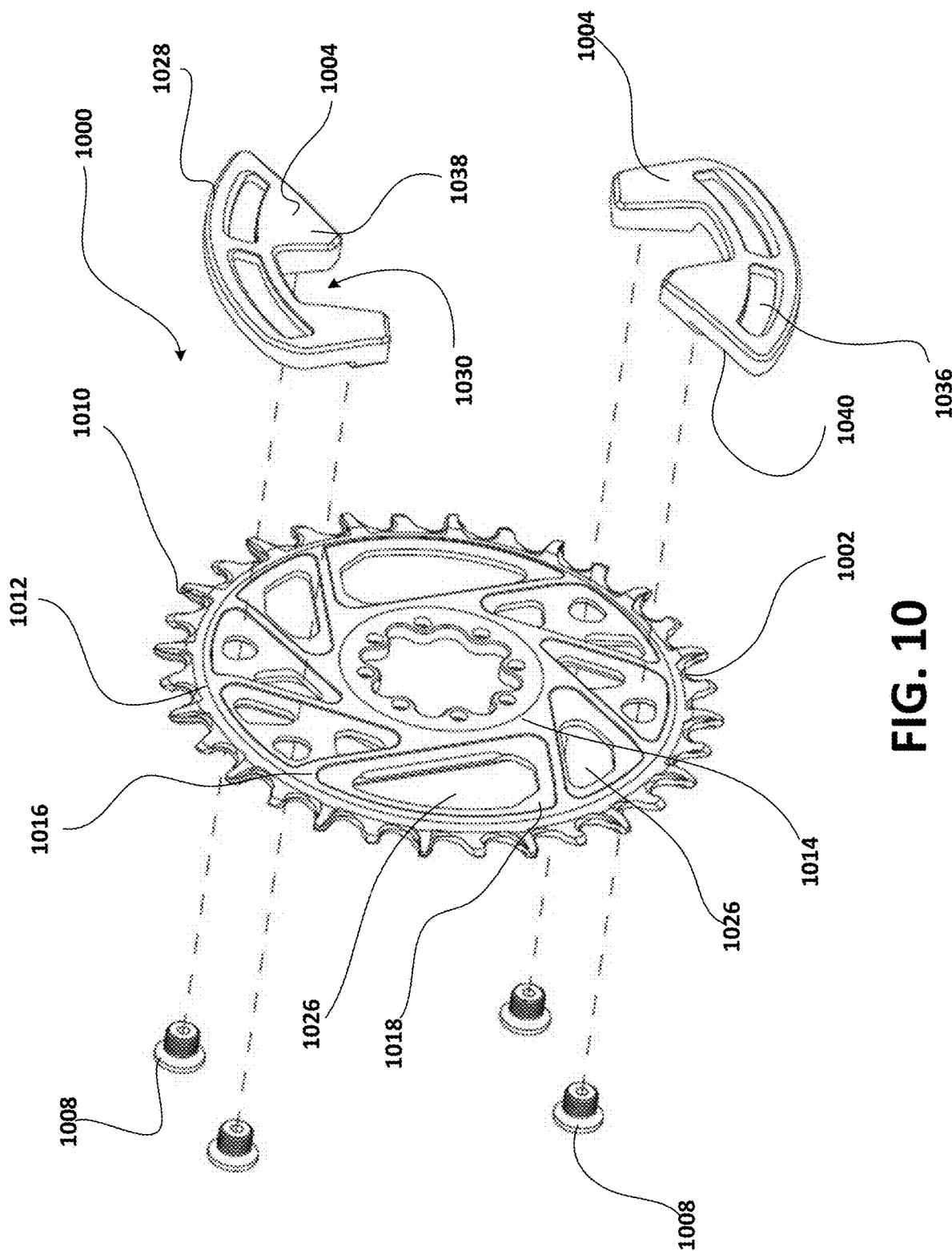
FIG. 10 is an exploded perspective view of a chainring protection system according to a third embodiment.
Figure 11:
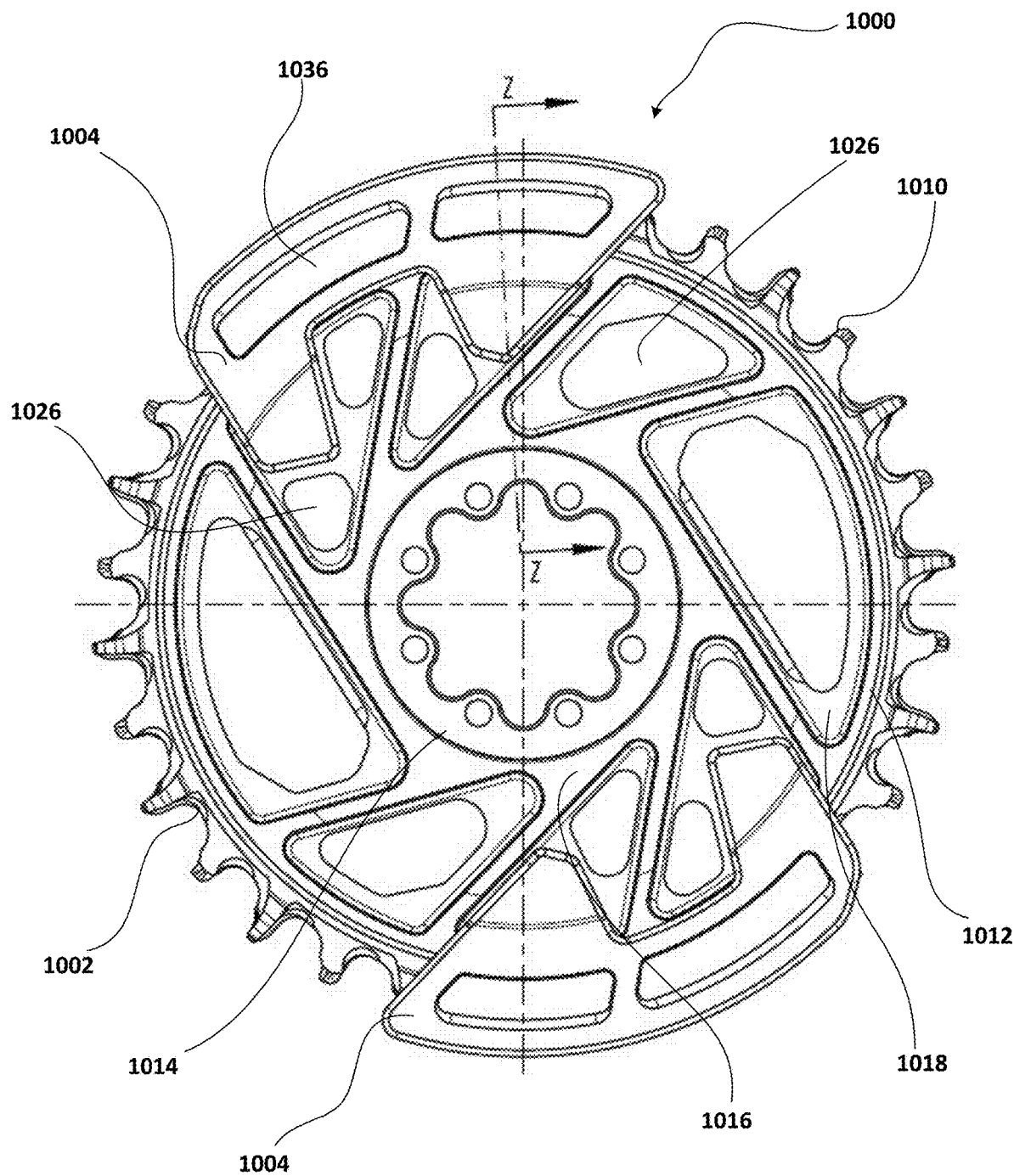
FIG. 11 is a front view of the chainring protection system of FIG. 10 assembled.
Figure 12:
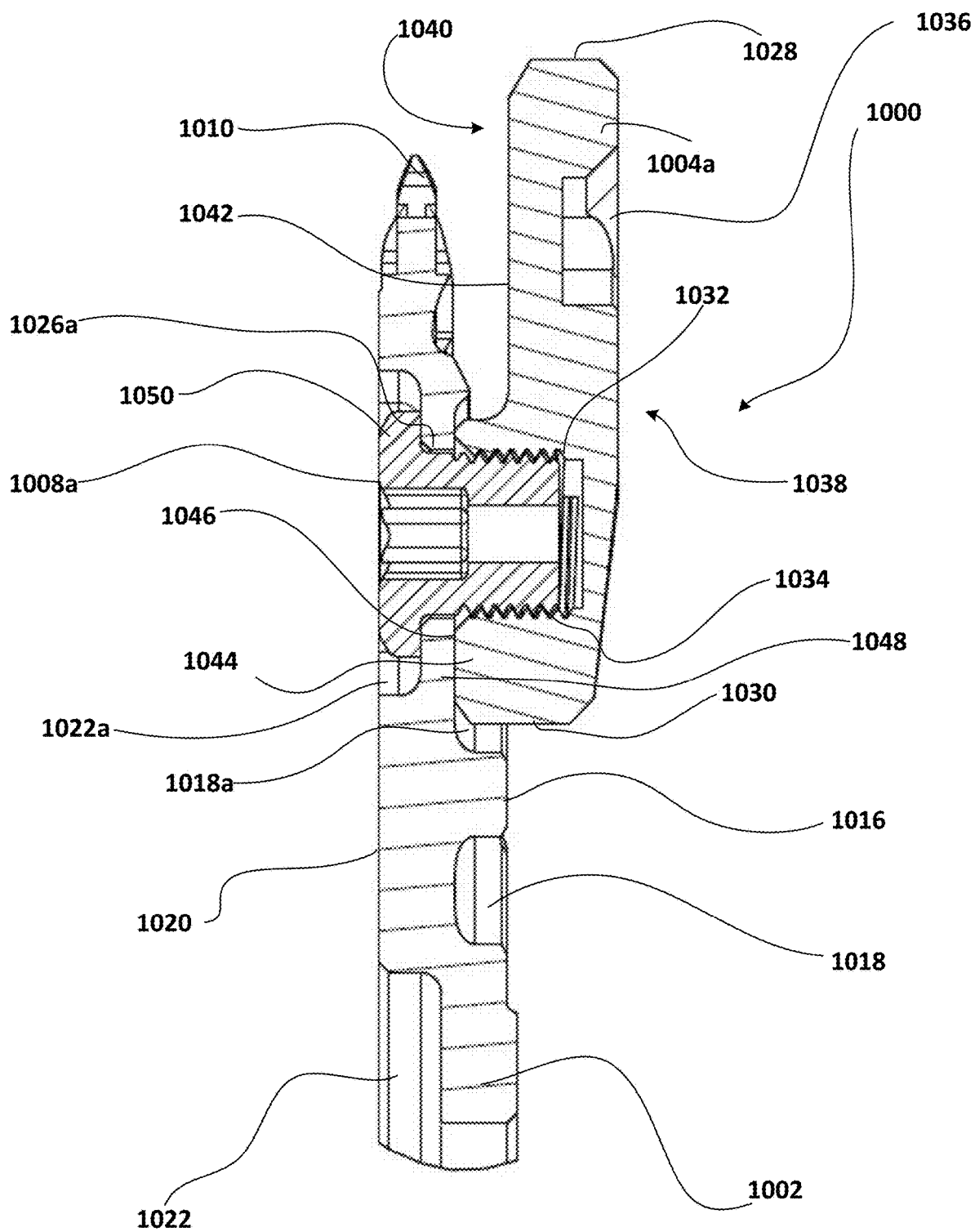
FIG. 12 is a sectional view of the chainring protection system of FIG. 10 assembled, taken along cross-section Z-Z shown in FIG. 11.

FIG. 10 is an exploded perspective view of an example chainring protection system 1000, according to a third embodiment. FIG. 11 is a front view of the chainring protection system 1000 assembled, and FIG. 12 is a section view of the chainring protection system 1000 assembled. The embodiment illustrated in FIGS. 10-12 includes a chainring 1002, two bash guards 1004, and four fasteners 1008. The embodiment shown in FIGS. 10-12 does not include any back plates, as the two bash guards 1004 are fastened directly to the chainring 1002 with the fasteners 1008. The chainring 1002 includes teeth 1010. The teeth 1010 may not all be identical. For example, the teeth 1010 around the chainring 1002 may vary in height, thickness, shape, etc. The teeth 1010 are configured to interact with the chain 122 of the bicycle 100.

In the embodiment, the chainring 1002 includes a torque output section 1012 including the teeth 1010 configured as a sprocket (e.g., a power output sprocket for the chainring 1002). The chainring 1002 also includes a torque input section 1014 that is attachable to the crank assembly 120 of the bicycle 100.

In the embodiment, the torque output section 1012 and the torque input section 1014 of the chainring 1002 are formed as a unitary single piece. As shown in FIGS. 10 and 12, viewing the chainring 1002 from the front, the chainring 1002 includes a flat portion 1016 and front recessed portions 1018. The front recessed portions 1018 are recessed relative to the flat portion 1016. As shown in FIG. 12, when viewing the chainring 1002 from the rear, the chainring 1002 includes a flat portion 1020 and rear recessed portions 1022. The rear recessed portions 1022 are recessed relative to the flat portion 1020. The rear recessed portions 1022 may mirror the front recessed portions 1018. Alternatively, the rear recessed portions 1022 may be sized, shaped, and/or positioned differently compared to the front recessed portions 1018.

The chainring 1002 also includes windows 1026 (e.g., openings). The windows 1026 may be disposed within the recessed portions 1018, 1022 and extend through the chainring 1002. The chainring 1002 may include any number of windows 1026 of any number of sizes and/or shapes. For example, as shown in the embodiment of FIGS. 10-12, the chainring 1002 may include a number of windows 1026 of varying size and shape disposed around the chainring 1002. The varying size and shape of the windows 1026 may allow for different numbers, sizes, and/or shapes of bash guards to be used with a single chainring 1002. In the present embodiment, there are fourteen total windows 1026, with seven different sized and shaped windows 1026. In an alternate embodiment, there may be more windows 1026 (e.g., twenty windows) or fewer windows 1026 (e.g., ten windows).

In the embodiment, each of the bash guards 1004 includes an outer edge 1028 (e.g., a radially outer edge, part of a radially outer side) and an inner edge 1030 (e.g., a radially inner edge, part of a radially inner side). In the present embodiment, the outer edge 1028 has a rounded curvature that follows a radially outer curve of the chainring 1002. The inner edge 1030 may correspond to positioning of one or more of the windows 1026 within the chainring 1002. In alternate embodiments, the outer edge 1028 and the inner edge 1030 may take on different shapes. Referring to FIG. 12, the bash guard 1004 includes at least one bash guard opening 1032 (e.g., two bash guard openings) that may include threads 1034 and/or threaded inserts (e.g., molded into the bash guard 1004). In an embodiment, the outer edge 1028 is a tooth protective portion configured to protect teeth of the chainring 1002 from impact.

The bash guards 1004 are shown having openings 1036 (e.g., gaps, recesses, or through-holes). The openings 1036 may be sized and shaped to follow the rounded curvature of the outer edge 1028 of the bash guard 1004. In the present embodiment, the bash guard 1004 includes two openings 1036. In one embodiment, the bash guard 1004 include more (e.g., three openings 1036), fewer (e.g., a single continuous opening 1036), and/or different openings 1036 through the bash guard 1004. In another embodiment, the bash guard 1004 does not include any openings 1036.

Referring to FIGS. 10 and 12, each of the bash guards 1004 has a first side 1038 (e.g., an outer side or outboard side) and a second side 1040 (e.g., an inner side or inboard side) opposite the first side 1038. Referring to FIG. 12, the second side 1040 of the respective bash guard 1004 includes a flat portion 1042 and one or more extensions 1044 (e.g., raised surfaces) extending away from the flat portion 1042. For example, the embodiment shown in FIGS. 10-12 includes two extensions 1044 extending away from opposite sides of the flat portion 1042 (e.g., at radial portions of the bash guard 1004 extending away from a circumferential portion of the bash guard 1004). Each of the two extensions 1044 houses a bash guard opening 1032 (e.g., including threads 1034). In other embodiments, the bash guard 1004 may include more, fewer, and/or different (e.g., differently sized and/or shaped) extensions compared to the embodiment shown in FIGS. 10-12. For example, the bash guard 1004 may include one extension 1044 or three extensions 1044. Other numbers of extensions 1044 may be provided.

Each of the two extensions 1044 is positioned within a respective one of the front recessed portions 1018. An outer surface 1046 of the respective extension 1044 may be sized and shaped to match a profile (e.g., a perimeter) of the respective front recessed portion 1018. Alternatively, the outer surface 1046 may be smaller and/or shaped differently than the profile of the respective front recessed portion 1018.

The fasteners 1008 extend through windows 1026 respectively sized and shaped for the fasteners 1008. Referring to FIG. 12, a first extension 1044 of a first bash guard 1004a is positioned within a first front recessed portion 1018a at the front side of the chainring 1002, and a first fastener 1008a extends through a first window 1026a. The first window 1026a extends through a wall 1048 (e.g., a flange or an extension) formed between the first front recessed portion 1018a and a first rear recessed portion 1022a, respectively, such that a head 1050 of the first fastener 1008a is disposed at least partially within the first rear recessed portion 1022a when the first fastener 1008a is connected to the first bash guard 1004a via the threads 1034 at the first extension 1044. The head 1050 of the first fastener 1008a may have a larger diameter than the first window 1026a, such that the head 1050 may not move through the first window 1026a. In one embodiment, as shown in FIG. 12, the head 1050 of the first fastener 1008a is positioned entirely within the first rear recessed portion 1022a when the first fastener 1008a is connected to the first bash guard 1004a via the threads 1034 at the first extension 1044. This positioning and attachment may be repeated a number of times for additional fasteners 1008 and extensions 1044.

The bash guards 1004 may be made of any number of materials. For example, the bash guards 1004 may be made of aluminum. In other embodiments, the bash guards 1004 are made of a different material (e.g., steel).

In other embodiments, more or fewer bash guards 1004, windows 1026, fasteners 1008, and/or extensions 1044 may be provided. For example, another embodiment of a chainring protection system 1000 may include four bash guards 1004, eight windows 1026, eight fasteners 1008, and eight extensions 1044.

Referring to FIG. 11, each of the bash guards 1004 may protect eight teeth 1010 (e.g., a circumferential portion of the chainring 1002 including less than all teeth 1010). Generally, by not covering all of the teeth 1010 of the chainring 1002 and covering the likely impact zones of the chainring 1002, the bash guards 1004 are lighter in weight. In an alternate embodiment, more or fewer teeth 1010 may be protected by the bash guards 1004. In a further alternate embodiment, the bash guards 1004 may protect a different set of teeth 1010 on a different area of the chainring 1002.

In the embodiment of FIGS. 10-12, two bash guards 1004 are shown. In an alternate embodiment, only one bash guard 1004 may be used, which may cover the same, more, or fewer teeth 1010.

If the chain 122 of the bicycle 100 falls off a chainring (e.g., the chainring 1002) while riding, the chain 122 may jam around a bash guard (e.g., the bash guard 1004) and possibly damage the rear gear change device 134, for example. Accordingly, the bash guard 1004 may include a chamfer feature that prevents the chain 122 from jamming. The bash guard 1004 may also include a leading edge chamfer that is able to guide the chain 122 back onto teeth of the chainring 1002.

Figure 13:
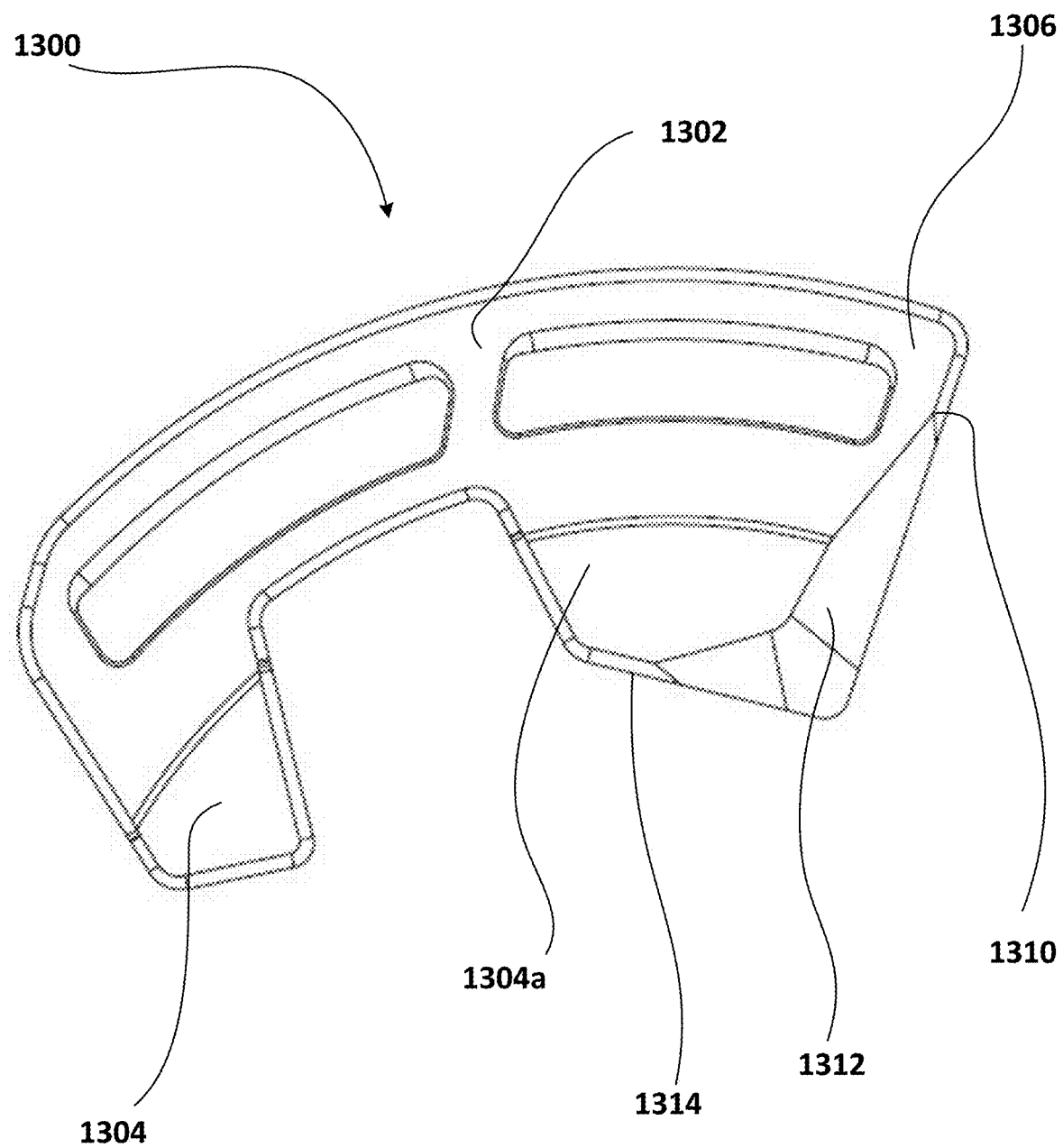
FIG. 13 is a front view of an embodiment of a bash guard.
Figure 14:
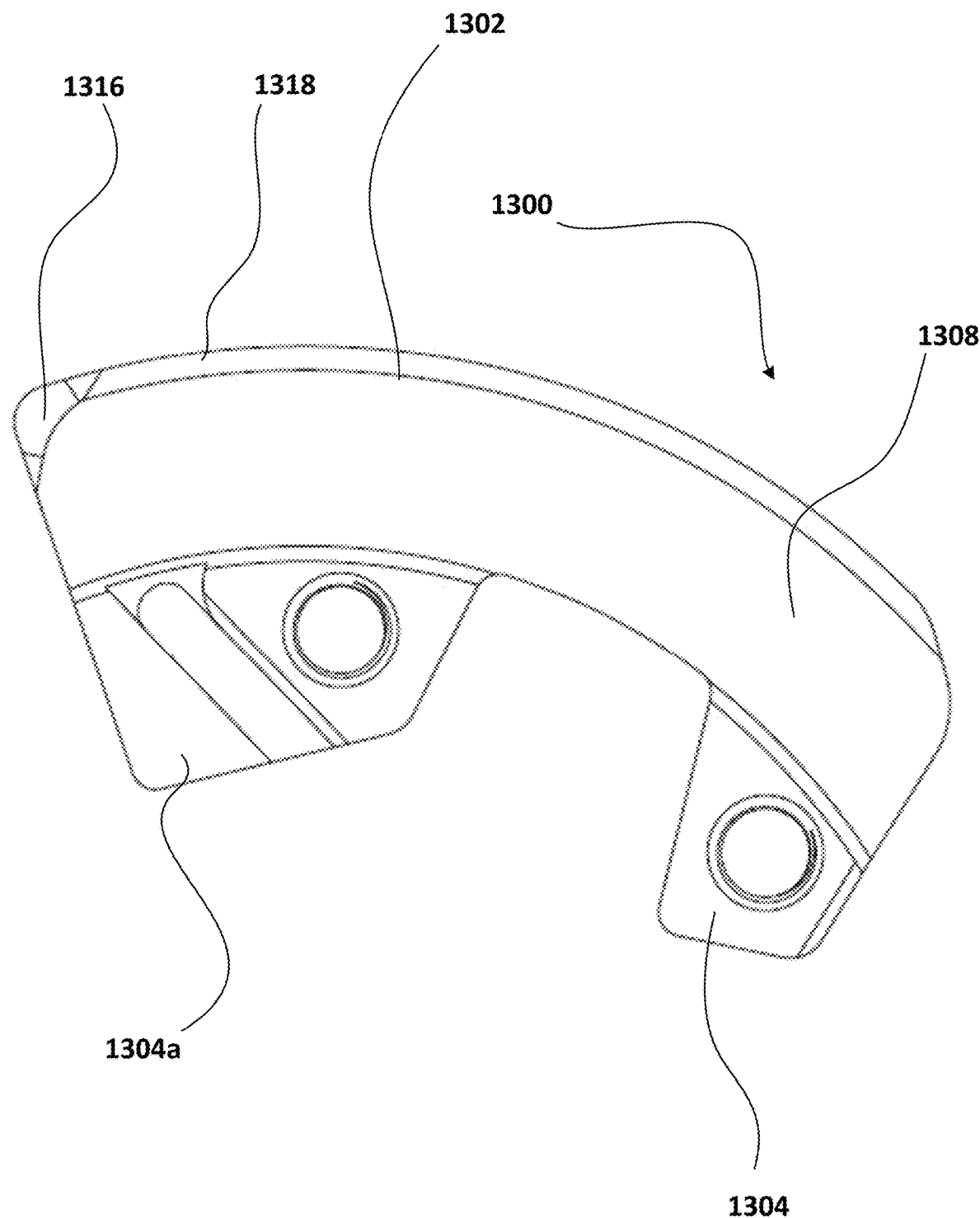
FIG. 14 is a rear view of the bash guard of FIG. 13.

FIGS. 13 and 14 illustrate an example embodiment of such chamfer features. FIG. 13 is a front view of a bash guard 1300, and FIG. 14 is a rear view of the bash guard 1300. A body of the bash guard 1300 has a circumferential portion 1302 and at least one radial portion 1304 (e.g., two radial portions). The two radial portions 1304 extend radially inwards relative to the circumferential portion 1302. The two radial portions 1304 may extend radially inwards further compared to the embodiments shown in FIGS. 1-12, so that the chain 122 may be guided at a correct time and jamming may be prevented.

The bash guard 1300 has a first side 1306 (e.g., an outer side or an outboard side; see FIG. 13) and a second side 1308 (e.g., an inner side or an inboard side; see FIG. 14) opposite the first side 1306. The bash guard 1300 also has a leading side 1310 (e.g., part of a first radial portion 1304a of the two radial portions 1304). The leading side 1310 of the bash guard 1300 is in front or leads when the crank assembly 120 is being driven. Referring to FIG. 13, the bash guard 1300 may include a first chamfer feature 1312 at the leading side 1310, the first side 1306, and a radially inner side 1314 of the first radial portion 1304a of the bash guard 1300. In other embodiments, the first chamfer feature 1312 may be disposed at more, fewer, and/or different sides of the bash guard 1300 (e.g., the leading side 1310 and the first side 1306). The first chamfer feature 1312 prevents the chain 122 from jamming around the bash guard 1300, as the chain 122 may move up onto the first side 1306 of the bash guard 1300 when the chain 122 falls off the chainring 1002 instead of jamming up around the bash guard 1300 due to the first chamfer feature 1312.

Referring to FIG. 14, the bash guard 1300 may also include a second chamfer feature 1316 at the leading side 1310, the second side 1308, and a radially outer side 1318 of the bash guard 1300. The second chamfer feature 1316 may bias the chain 122 towards the chainring 1002 and guide the chain 122 back onto the chainring 1002 as the crank assembly 120 continues to be driven.

The first chamfer feature 1312 and the second chamfer feature 1316 may help the chain 122 on the chainring 1002 when the bicycle 100 is being ridden over rough terrain. The bash guard 1300 may be configured, such that the bash guard 1300 protrudes more radially compared to the embodiments shown in FIGS. 1-12. Large motions of the chain 122 may contact the bash guard 1300 instead of falling to the outboard side of the chainring 1002. In one embodiment, a radially outer portion of the bash guard 1300 is made of or includes a different material than the rest of the bash guard 1300. For example, the radially outer portion of the bash guard 1300 is made of or includes a rubber material to improve chain retention and to damp chain motion. In an example, when the outer portion of the bash guard is made of rubber, has rubber added, or has rubber over molded onto the bash guard/cover, the rubber portion may go on the surface of the bash guard and may be impacted/contacted by debris during a ride, reducing the impact and vibration felt by a user of the bicycle.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A chainring protection system comprising:
   a chainring having a torque input section and a torque output section, the torque output section being radially outer relative to the torque input section and having a plurality of teeth;
   a backplate; and
   a cover having a connection to the chainring spaced a radial distance outward from the torque input section, such that the cover at least partially covers a circumferential portion of the torque output section of the chainring, the circumferential portion of the torque output section including less than all teeth of the plurality of teeth,
   wherein the cover is configured to interface with the backplate, such that the cover is connected to the chainring.

2. The chainring protection system of claim 1, wherein the cover is a first cover, and the circumferential portion is a first circumferential portion, and
   wherein the chainring protection system further comprises a second cover connected to the chainring, such that the second cover covers a second circumferential portion of the torque output section of the chainring.

3. The chainring protection system of claim 2, wherein the first cover at least partially covers a first group of teeth of the plurality of teeth, and the second cover at least partially covers a second group of teeth of the plurality of teeth, the second group of teeth being different than the first group of teeth.

4. The chainring protection system of claim 2, wherein the second cover is connected to the chainring, such that the second cover is opposite the first cover.

5. The chainring protection system of claim 1, wherein the chainring includes at least one vacancy, and
   wherein the backplate and the cover interface via a vacancy of the at least one vacancy.

6. The chainring of claim 5, wherein the chainring further includes a flange disposed around and extending into the vacancy, and
   wherein the backplate is supported within the vacancy by the flange.

7. The chainring protection system of claim 6, further comprising a fastener configured to connect the backplate to the cover, such that the cover is connected to the chainring via the flange around the vacancy.

8. The chainring protection system of claim 1, further comprising a fastener,
   wherein the chainring includes at least one vacancy,
   wherein the cover includes a threaded opening, and
   wherein the fastener is configured to directly connect the cover to the chainring via a vacancy of the at least one vacancy and the threaded opening of the cover.

9. A cover for a chainring of a bicycle, the cover comprising:
   a body including a circumferential portion and at least one radial portion, the at least one radial portion extending radially inner relative to the circumferential portion;
   an opening extending at least partially through a radial portion of the at least one radial portion;
   a raised surface being positionable within a vacancy of the chainring,
   the raised surface completely surrounding the opening; and
   a threaded insert positioned within the opening.

10. The cover of claim 9, wherein the threaded insert is made of a metal material, and the body is made of a non-metal material.

11. The cover of claim 9, wherein the opening is a tapped hole.

12. The cover of claim 11, wherein the body is made of a metal material.

13. The cover of claim 9, wherein the opening is a first opening, and the radial portion is a first radial portion,
   wherein the at least one radial portion of the body includes two radial portions,
   wherein the cover further comprises a second opening extending at least partially through a second radial portion of the two radial portions,
   wherein the first radial portion and the second radial portion of the body extend radially inner relative to the circumferential portion at opposite sides of the circumferential portion, respectively.

14. The cover of claim 9, wherein the body has an outboard side and an inboard side opposite the outboard side, the outboard side being outboard relative to a frame of the bicycle when the cover is attached to the chainring, and
   wherein the opening extends from the inboard side partially into the radial portion of the body.

15. The cover of claim 14, wherein the body also has a front side extending between the outboard side and the inboard side,
   wherein the circumferential portion of the body has a radially outer side, and the radial portion of the body has a radially inner side, the radially inner side of the radial portion being radially inner relative to the radially outer side of the circumferential portion, and
   wherein the cover further comprises a chamfer feature at the outboard side and the front side of the body, and the radially inner side of the radial portion.

16. The cover of claim 15, wherein the chamfer feature is a first chamfer feature, and
   wherein the cover further comprises a second chamfer feature at the inboard side and the front side of the body, and the radially outer side of the circumferential portion.

17. A chainring protection system comprising:
   a chainring having a torque input section, a torque output section, and at least two openings through the chainring, the torque output section being radially outer relative to the torque input section and including a plurality of teeth;
   at least two backplates;

at least two covers having a connection to the chainring spaced a radial distance outward from the torque input section, wherein a first cover of the at least two covers at least partially covers a first group of teeth of the plurality of teeth, and a second cover of the at least two covers at least partially covers a second group of teeth of the plurality of teeth, the second group of teeth being different than the first group of teeth; and at least two fasteners configured to connect the first cover and the second cover to the chainring via a first opening of the at least two openings and a second opening of the at least two openings, respectively, wherein the at least two covers are configured to interface with the at least two backplates, such that the at least two covers are connected to the chainring.

\* \* \* \* \*